US005970430A

United States Patent [19]

Burns et al.

[11] Patent Number: 5,970,430

[45] Date of Patent: Oct. 19, 1999

[54] LOCAL DEVICE AND PROCESS DIAGNOSTICS IN A PROCESS CONTROL NETWORK HAVING DISTRIBUTED CONTROL FUNCTIONS

[75] Inventors: Harry A. Burns; Brent H. Larson; Larry K. Brown, all of Marshalltown, Iowa

[73] Assignee: Fisher Controls International, Inc., Clayton, Mo.

[21] Appl. No.: 08/922,938

[22] Filed: Sep. 3, 1997

Related U.S. Application Data

[63] Continuation-in-part of application No. 08/726,262, Oct. 4, 1996, abandoned.

[51] Int. Cl.[6] .............................. G06F 15/40; G06F 11/30

[52] U.S. Cl. ................ 702/122; 364/468.24; 395/182.09

[58] Field of Search ..................................... 364/138, 188, 364/139, 130, 468.24; 702/122; 137/487.5; 395/651, 683, 182.09

[56] References Cited

U.S. PATENT DOCUMENTS

| | | | |
|---|---|---|---|
| 4,271,505 | 6/1981 | Menot et al. | 370/85 |
| 4,627,045 | 12/1986 | Olson et al. | 370/16 |
| 4,691,328 | 9/1987 | Sterling, Jr. et al. | 375/36 |

(List continued on next page.)

FOREIGN PATENT DOCUMENTS

| | | |
|---|---|---|
| 0 450 116 A1 | 4/1990 | European Pat. Off. . |
| 0 449 458 A1 | 10/1991 | European Pat. Off. . |
| 0 546 339 A1 | 6/1993 | European Pat. Off. . |
| 0 562 333 A2 | 9/1993 | European Pat. Off. . |
| 0 575 150 A2 | 12/1993 | European Pat. Off. . |
| 0 604 091 A2 | 6/1994 | European Pat. Off. . |
| 195 10 466 A1 | 10/1996 | Germany . |
| WO 92/04676 | 3/1992 | WIPO . |
| WO 94/22776 | 10/1994 | WIPO . |
| WO 96/12993 | 5/1996 | WIPO . |

OTHER PUBLICATIONS

Fieldbus Foundation Manual, Communications Technical Specification and User Layer Technical Specification, 1994–1997, including Fieldbus Message Specification FF–870–1.1; Physical Layer Conformance Testing FF–830 FS 1.0; Device Description Language FF–900–1.0; Function Blocks (Part 1) FF–890–1.2; Fieldbus Access Sublayer FF–875–1.1; Function Blocks (Part 2) FF–891–1.2; Data Link Protocol FF–822–1.1; System Management FF–880–1.1; Communication Profile FF–940–1.0; Transducer Blocks (Part 1) FF–902 Rev PS 2.0; Transducer Blocks (Part 2) FF–903–Rev PS 2.0; Data Link Services FF–821–1.0; 31.25 kbit/s Physical Layer Profile FF–816–1.0; Network Management FF–801–1.1; and System Architecture FF–800–1.0. No Date.

"FIELDVUE® ValveLink™ Series VL2000 Software," Fisher–Rosemount Bulletin 62.1: VL2000, pp. 1–6 (Nov. 1995).

(List continued on next page.)

*Primary Examiner*—Kamini Shah

*Attorney, Agent, or Firm*—Marshall, O'Toole, Gerstein, Murray & Borun

[57] ABSTRACT

A field device for use in a process control network having a plurality of devices communicatively coupled by a two-wire, all-digital communication bus includes a connector that connects the field device to the two-wire, all-digital bus to enable all-digital communication over the bus, a memory that stores a diagnostic test routine having a series of device or process diagnostic test instructions, and a controller that performs the device or process diagnostic test instructions stored in the memory to implement a device or process diagnostic test using the field device. A data collection unit within the field device collects diagnostic data generated during the diagnostic test and a communication unit communicates the collected diagnostic data over the bus to a host device for processing. The controller may include a program language interpreter adapted to interpret the diagnostic test instructions which may be provided to the field device from another one of the devices via the bus.

40 Claims, 11 Drawing Sheets

300

RECEIVE DIAGNOSTIC COMMAND FROM EXTERNAL SOURCE (302)

PERFORM DIAGNOSTIC TEST ACCORDING TO COMMAND (304)

SET TEST CONFIGURATION ACCORDING TO COMMAND (306)

MEASURE PLURALITY OF PARAMETERS FOR SELECTED TEST CONFIGURATION (308)

STORE MULTIPLE PARAMETER RESULTS (310)

TRANSMIT DATA TO COMMANDING DEVICE (312)

MODIFY TEST CONFIGURATION? (314) Y / N

U.S. PATENT DOCUMENTS

| | | | |
|---|---|---|---|
| 4,831,558 | 5/1989 | Shoup et al. | 364/550 |
| 4,918,690 | 4/1990 | Markkula, Jr. et al. | 370/94 |
| 4,955,305 | 9/1990 | Garnier et al. | 112/121.11 |
| 4,974,625 | 12/1990 | Paullus et al. | 137/85 |
| 4,976,144 | 12/1990 | Fitzgerald | 73/168 |
| 5,014,185 | 5/1991 | Saito et al. | 364/188 |
| 5,023,869 | 6/1991 | Grover et al. | 370/84 |
| 5,109,692 | 5/1992 | Fitzgerald | 73/168 |
| 5,146,401 | 9/1992 | Bansal et al. | 364/138 |
| 5,148,433 | 9/1992 | Johnson et al. | 371/11.3 |
| 5,193,189 | 3/1993 | Flood et al. | 395/650 |
| 5,197,328 | 3/1993 | Fitzgerald | 73/168 |
| 5,404,524 | 4/1995 | Celi, Jr. | 395/700 |
| 5,434,774 | 7/1995 | Seberger et al. | 364/172 |
| 5,439,021 | 8/1995 | Burlage et al. | 137/84 |
| 5,451,932 | 9/1995 | Seberger et al. | 340/310.06 |
| 5,469,150 | 11/1995 | Sitte | 340/825.07 |
| 5,469,548 | 11/1995 | Callison et al. | 395/441 |
| 5,485,455 | 1/1996 | Dobbins et al. | 370/60 |
| 5,530,643 | 6/1996 | Hodorowski | 364/191 |
| 5,558,115 | 9/1996 | Lenz et al. | 137/86 |
| 5,573,032 | 11/1996 | Lenz et al. | 137/486 |
| 5,592,622 | 1/1997 | Isfeld et al. | 395/200.02 |
| 5,631,825 | 5/1997 | van Weele et al. | 364/188 |
| 5,650,777 | 7/1997 | Westfield et al. | 340/870.11 |
| 5,684,451 | 11/1997 | Seberger et al. | 340/310.06 |

OTHER PUBLICATIONS

"FIELDVUE® VL2000 Series Software User Guide," Fisher Controls Version 2.0 (Jun. 1996).

"FIELDVUE® Digital Valve Controller Type DVC5000 Series," Fisher–Rosemount Bulletin 62.1:DVC5000, pp. 1–12 (Jun. 1994).

"FIELDVUE™, Digital Valve Controller DVC5000 Series Remotely Accessible Information," Fisher Controls Bulletin 62.1:DVC5000(S1), pp. 1–2 (Jun. 1994).

"FIELDVUE™ Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding FOUNDATION™ Fieldbus Technology," 27 pages, 1997.

"FOUNDATION™ Specification, Function Block Application Process," Part 3, 155 pages, 1995–1996.

Fieldbus Foundation™, "Technical Overview," FD–043 Revision 1.0, 29 pages, 1996.

Fromberger, "Feldbusfähige, intelligente Sensoren," Messen und Prüfen, vol. 27, No. 7, pp. 332, 334–340, 1991.

Watt, "The Double–Distributed Control Network," Thesis submitted to Thayer School of Engineering, Dartmouth College, Hanover, N.H. (Jan. 1984).

Zielinski et al., "Asset Management Using Fieldbus," Fisher–Rosemont Systems, Inc, pp. 1–14 (1997).

"Advanced Systems Simplify Control," Machine Design, vol. 68, No. 12, pp. 118, 120 (Jul. 11, 1996).

Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument Society of America, pp. 345–354 (1993).

Zielinski, "Issues for Digital Field Instrument Networks," INTECH, pp. 92–94 (1989).

PCT International Search Report for PCT/US 97/17739 dated Jan. 28, 1998.

PCT Written Opinion issued in PCT application PCT/US97/17739 dated Jul. 8, 1998.

LOCAL DEVICE AND PROCESS DIAGNOSTICS IN A PROCESS CONTROL NETWORK HAVING DISTRIBUTED CONTROL FUNCTIONS

RELATED APPLICATION

This is a continuation-in-part of U.S. patent application Ser. No. 08/726,262 filed Oct. 4, 1996 now abandoned.

FIELD OF THE INVENTION

The present invention relates generally to process control networks and, more specifically, to a method of and an apparatus for performing local device and process diagnostics in a process control network having distributed control functions.

DESCRIPTION OF THE RELATED ART

Large processes such as chemical, petroleum, and other manufacturing and refining processes include numerous field devices disposed at various locations to measure and control parameters of the process to thereby effect control of the process. These field devices may be, for example, sensors such as temperature, pressure, and flow rate sensors as well as control elements such as valves and switches.

Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of devices within the process to thereby control process parameters according to some overall control scheme. Usually, however, the control scheme implemented by a DCS, is proprietary to the DCS controller manufacturer which, in turn, makes the DCS difficult and expensive to expand, upgrade, reprogram, and service because the DCS provider must become involved in an integral way to perform any of these activities. Furthermore, the equipment that can be used by or connected within any particular DCS may be limited due to the proprietary nature of DCS controller and the fact that a DCS controller provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, LONWORKS®, Device-Net®, and CAN protocols, which enable field devices made by different manufacturers to be used together within the same process control network. In fact, any field device that conforms to one of these protocols can be used within a process to communicate with and to be controlled by a DCS controller or other controller that supports the protocol, even if that field device is made by a different manufacturer than the manufacturer of the DCS controller.

Moreover, there is now a move within the process control industry to decentralize process control and, thereby, simplify DCS controllers or eliminate the need for DCS controllers to a large extent. Decentralized control is obtained by having process control devices, such as valve positioners, transmitters, etc. perform one or more process control functions and by then communicating data across a bus structure for use by other process control devices in performing other control functions. To implement these control functions, each process control device includes a microprocessor capable of performing one or more control functions as well as communicating with other process control devices using a standard and open communication protocol. In this manner, field devices made by different manufacturers can be interconnected within a process control network to communicate with one another and to perform one or more process control functions forming a control loop without the intervention of a DCS controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

As noted above, the decentralization of process control functions simplifies and, in some cases, eliminates the necessity of a proprietary DCS controller which, in turn, reduces the need of a process operator to rely on the manufacturer of the DCS controller to change or upgrade a control scheme implemented by the DCS controller. However, decentralized control also makes it more difficult to perform diagnostics, such as process diagnostics, which are typically performed by a DCS controller. Performing regular diagnostics, such as device and process diagnostics, is very important, however, when using field devices such as fluid control valves in harsh environments in which, for example, temperature and pressure ranges are widely variable. In such environments, substantial maintenance, including periodic preventative maintenance, maintenance due to valve breakdown, and testing to verify that valves are functioning properly, is necessary.

In a standard DCS environment, a computer (such as a personal computer) is coupled to the network and performs device diagnostics on, for example, a valve or a positioner/valve combination, by sending a diagnostic control signal to the positioner, which then forces the valve through a test stroke or test cycle associated with the diagnostic control signal. During this time, the computer measures outputs of the positioner and/or the valve, such as changes in valve position, that occur in response to the diagnostic control signal and, thereafter, performs analysis on the measured outputs to determine the operating condition of the valve or the positioner/valve device.

In one known diagnostic system for fluid control valves, such as pneumatically actuated valves, a pressure sensor is provided to sense varying pressure at the input of a valve and a position sensor is provided to sense the movement of a valve plug. The valve is operated through a test operation cycle by supplying a controlled variable pneumatic pressure to the input terminal of a pneumatic valve. During, for example, the test operation cycle of a dynamic scan, the valve plug is moved through a desired range, normally from a fully opened position to a fully closed position and returned from the fully closed position to the fully opened position. Alternatively, step tests may move the valve plug in a series of individual steps to test certain valve parameters.

During the test operation cycle, the pressure sensor provides an output signal that corresponds to varying pressure at the valve input, and the position sensor provides an input signal corresponding to the movement of the valve plug. The respective input or output signals of the air pressure at the actuator and the valve plug or valve stem position are then processed to derive data representing the variation in pressure at the valve input as a function of movement of the valve plug during the test operation cycle. The valve stem load is derived by multiplying the air pressure times the effective area of the actuator diaphragm.

The diagnostic system receives the diagnostic commands and communicates the diagnostic information obtained from the sensors via a communication line to an external control console or processor/computer. The external control console or processor/computer requests a single diagnostic test and waits for a result while the diagnostic system performs the test. When the test is complete, the diagnostic system sends the test result to the external control console. Many various diagnostic tests are performed for each valve and a control system generally includes many valves so that diagnostic test time can be lengthy.

As is also known, in a standard DCS environment, a computer such as a DCS controller performs process diagnostics using, for example, a valve or a positioner/valve combination, by sending a diagnostic control signal to the positioner, which then forces the valve through a test sequence.

In a standard DCS environment, device or process diagnostics can be performed without rewiring or reconfiguring the system to a significant extent because the DCS controller or the external computer is already configured to control the set points (or other inputs) of the various devices within the process and to measure device outputs and other process parameters to implement a control strategy associated with the normal operation of the process. As a result, performing diagnostics in a standard DCS environment is really a matter of using the DCS controller or other external computer in a slightly different way to control one or more devices within the process and using the DCS controller or other external computer to measure process or device parameters. Thus, in standard DCS environments, diagnostic routines can be stored in and used by a centralized DCS controller or other centralized external computer to perform almost any device or process diagnostic and these diagnostic routines can be used without reconfiguring the process control network in any significant manner. Unfortunately, because of the centralized nature of these diagnostics routines, they do not provide much detailed information about field devices.

However, in a process control network having distributed control functions, a centralized system controller, to the extent it exists, is not configured to individually control all of the field devices within a process and is not configured to receive data pertaining to all of the appropriate device or process parameters necessary for performing device and process diagnostics. Instead, different process control loops of the control strategy are implemented by a number of communicatively linked devices located at distributed places within the process control network. Typically, these devices are configured to use scheduled periodic communications to communicate data necessary for implementation of the specific control functions associated with a process control loop and to communicate other data (such as set point changes) using aperiodic or asynchronous communications. As a result, in a process control network having distributed control functions implemented using scheduled periodic communications, a host device is unable to send a strictly deterministic diagnostic control signal to a process control device while the system is configured to implement the normal control strategy because the host device must use asynchronous communications to deliver the diagnostic control signal and, therefore, has no way of controlling the precise time that the diagnostic control signal (or the different portions thereof) arrive at the device being tested. In fact, using asynchronous communications, a host device has no way of knowing when the diagnostic control signal or any particular part thereof) actually arrives at the input of the device being controlled. As a result, for a host device to send a deterministic diagnostic control signal to a device in a process control network having distributed control functions, the control configuration of the network must be reconfigured, which requires taking the process off-line.

Furthermore, while some process control devices, such as the Fieldvue and the Flowscanner devices manufactured and sold by Fisher Controls International Inc., are capable of performing self diagnostics, these devices are limited for use in process control systems that use an analog or a combined analog/digital communication protocol to effect communications between different devices. Currently, there is no process control field device capable of performing self diagnostics in an all-digital system, such as a Fieldbus system, or in a communication system that performs distributed control functions.

Furthermore, process control devices that can perform self diagnostics are typically limited to performing only the diagnostics hardcoded into the device by the device manufacturer and, therefore, are incapable of performing diagnostic routines or tests generated by a host or a user (which may include routines developed by a different device manufacturer). This situation prevents a user from being able to run the same test on all of the different types of devices within a plant.

Still further, process control devices that perform self diagnostics are generally incapable of performing process diagnostics. Thus, a host device must be set up to perform process diagnostics even in a system having field devices that can perform some self diagnostics (i.e., device diagnostics). As noted above, however, it is difficult for a host device to perform process diagnostics in a process control system having distributed functions because the control configuration must be reconfigured to allow the host to synchronously control a device. Moreover, the use of the different control scheme during process diagnostics may produce results that are erroneous or inaccurate with respect to the control scheme run during normal operation of the process. Also, field devices with diagnostic capabilities have not been capable of diagnosing other field devices without local diagnostic capabilities.

SUMMARY OF THE INVENTION

The present invention is directed to a method of and a device for performing device and process diagnostics on and from a particular process control device within a process control network and, preferably, within a process control network having distributed control functions. According to the present invention, a diagnostic test routine (which may be a device or a process diagnostic test routine) is stored in and implemented by a process control device to perform diagnostics on that process control device without the necessity of reconfiguring the control scheme associated with the process control network. As a result, the diagnostic test routine may be implemented according to the present invention while a process is being controlled under essentially the same control strategy as that implemented during normal operation of the process. Moreover, the device or process diagnostic test routine implemented by a process control device according to the present invention may be generated by a user at a host device and delivered to the process control device before the diagnostic test routine is run, which enables the process control device to implement any desired diagnostic test routine, including routines supplied by other device manufacturers.

According to one aspect of the present invention, a field device, capable of being used in a process control system that has a plurality of field devices mutually coupled by a two-wire, digital, powered bus, includes a pneumatically operated fluid control valve, a positioner coupled by a pneumatic pressure line to the fluid control valve for generating a pneumatic pressure that causes the fluid control valve to move to a position ranging from an open position to a closed position and a position sensor coupled to the positioner and to the fluid control valve for sensing the position of the fluid control valve. A pressure sensor is coupled to the pneumatic pressure line for sensing the pneumatic pressure applied to the fluid control valve and an electrical to pneumatic transducer is coupled to the positioner by the pneumatic pressure line for controlling the pneumatic pressure in the pneumatic pressure line as a function of an electrical signal. An electronic controller is coupled to the electrical to pneumatic transducer, the pressure sensor, and the position sensor, and includes control logic that determines the electrical signal based on feedback signals indicative of a pressure sensed by the pressure sensor and a position sensed by the position sensor and based on the field device control signal. Moreover, a digital interface is coupled to the two-wire, digital, powered bus and to the electronic controller an for supplying power derived from the powered bus to the field device and a two-way communication circuit that receives signals including the field device control signal from the bus and that transmits signals indicative of a status of the field device to the bus.

According to another aspect of the present invention, a field device for use in a process control network having a plurality of devices communicatively coupled by a two-wire, all-digital communication bus includes a connector that connects to the two-wire, all-digital bus to enable all-digital communication over the bus, a memory that stores a diagnostic test routine having a series of diagnostic test instructions, and a controller that performs the diagnostic test instructions stored in the memory to implement a diagnostic test using the field device. The field device also includes a data collection unit that collects diagnostic data generated during the diagnostic test and a communication unit that communicates the collected diagnostic data over the bus in an all-digital format.

Preferably, the controller includes a program language interpreter adapted to interpret a program language and the diagnostic test instructions are stored in the program language and are delivered to the controller of the field device from a second one of the plurality of devices via the bus. Likewise, the diagnostic test instructions may perform a device and/or a process diagnostic, as desired. If the diagnostic test instructions specify a process diagnostic, the data collection unit is adapted to receive data generated by other devices during the diagnostic test.

According to a still further aspect of the present invention, a field device for use in a process control network having a plurality of devices communicatively coupled by a bus includes a memory that stores a diagnostic test routine having a series of diagnostic test instructions, a device controller that performs the diagnostic test instructions stored in the memory to implement a diagnostic test, a data collection unit that collects diagnostic data generated during the diagnostic test and a communication unit that receives the diagnostic test instructions from a second one of the plurality of devices via the bus, that stores the received diagnostic test instructions in the memory and that communicates the collected diagnostic data over the bus.

According to a yet another aspect of the present invention, a field device for use in performing a process diagnostic test in a process control network having a plurality of devices communicatively coupled by a bus includes a memory that stores a process diagnostic test routine having a series of diagnostic test instructions to be implemented by the field device and a device controller that performs the process diagnostic test instructions stored in the memory to implement a process diagnostic test. The field device also includes a data collection unit that collects diagnostic data generated by the field device during the process diagnostic test and that receives further process diagnostic data from a second one of the plurality of devices via the bus. A communication unit within the field device communicates the collected diagnostic data and the further process diagnostic data over the bus after the process diagnostic test is completed.

DESCRIPTION OF THE PREFERRED EMBODIMENTS

Figure 1:
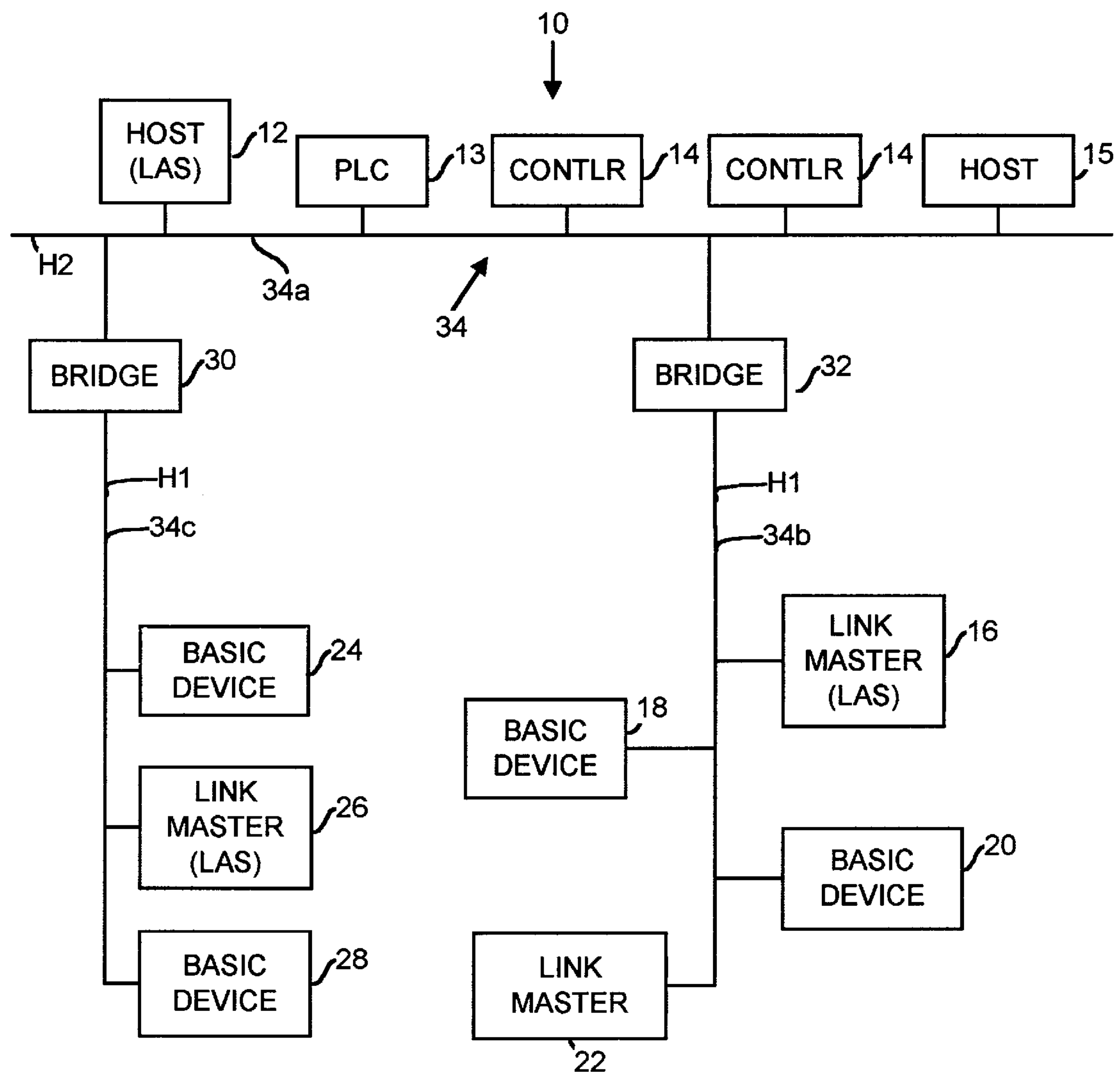
FIG. 1 is a schematic block diagram of a process control network using the Fieldbus protocol.

While the device and process diagnostics of the present invention are described in detail in conjunction with a process control network that implements process control functions in a decentralized or distributed manner using a set of Fieldbus devices, it should be noted that the diagnostics of the present invention can be used with process control networks that perform distributed control functions using other types of field devices and communication protocols, including protocols that rely on other than two-wire buses and protocols that support only analog or both analog and digital communications. Thus, for example, the device or process diagnostics of the present invention can be used in any process control network that performs distributed control functions even if this process control network uses the HART, PROFIBUS, etc. communication protocols or any other communication protocols that now exist or that may be developed in the future. Furthermore, the diagnostics of the present invention may also be used with standard process control networks that do not perform distributed control functions, such as HART networks, etc., and may be used within any desired process control device, including valves, positioners, transmitters, etc.

Before discussing the details of the diagnostics of the present invention, a general description of the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex.. In particular, the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby expressly incorporated by reference herein in their entirety.

The Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process facility, which enables these field devices to perform control functions at locations distributed throughout a process and to communicate with one another before and after the performance of these control functions to implement an overall control strategy. Because the Fieldbus protocol enables control functions to be distributed throughout a process control network, it reduces the complexity of, or entirely eliminates the necessity of the centralized process controller typically associated with a DCS.

Referring to FIG. 1, a process control network 10 using the Fieldbus protocol may include a host 12 connected to a number of other devices such as a program logic controller (PLC) 13, a number of controllers 14, another host device 15 and a set of field devices 16, 18, 20, 22, 24, 26, 28, 30, and 32 via a two-wire Fieldbus loop or bus 34. The bus 34 includes different sections or segments, 34*a*, 34*b*, and 34*c* which are separated by bridge devices 30 and 32. Each of the sections 34*a*, 34*b*, and 34*c* interconnects a subset of the devices attached to the bus 34 to enable communications between the devices in a manner described hereinafter. Of course, the network of FIG. 1 is illustrative only, there being many other ways in which a process control network may be configured using the Fieldbus protocol. Typically, a configurer is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, receiving some of the data generated by the field devices 16–32, and interfacing with one or more user terminals, which may be located in the host 12 or in any other device connected to the host 12 in any manner.

The bus 34 supports or allows two-way, purely digital communication and may also provide a power signal to any or all of the devices connected thereto, such as the field devices 16–32. Alternatively, any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34*a*, 34*b*, and 34*c*, the Fieldbus protocol allows other device/wire topologies including point-to-point connections, in which each device is connected to a controller or a host via a separate two-wire pair (similar to typical. 4–20 mA analog DCS systems), and tree or "spur" connections in which each device is connected to a common point in a two-wire bus which may be, for example, a junction box or a termination area in one of the field devices within a process control network.

Data may be sent over the different bus segments 34*a*, 34*b*, and 34*c* at the same or different communication baud rates or speeds according to the Fieldbus protocol. For example, the Fieldbus protocol provides a 31.25 Kbit/s communication rate (H1), illustrated as being used by the bus segments 34*b* and 34*c* of FIG. 1, and a 1.0 Mbit/s and/or a 2.5 Mbitis (H2) communication rate, which will be typically used for advanced process control, remote input/output, and high speed factory automation applications and is illustrated as being used by the bus segment 34*a* of FIG. 1. Likewise, data may be sent over the bus segments 34*a*, 34*b*, and 34*c* according to the Fieldbus protocol using voltage mode signaling or current mode signaling. Of course, the maximum length of each segment of the bus 34 is not strictly limited but is, instead, determined by the communication rate, cable type, wire size, bus power option, etc. of that section.

The Fieldbus protocol classifies the devices that can be connected to the bus 34 into three categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments to which the bridge is coupled and/or may take other actions necessary to link different segments of the bus 34. Bridge devices that connect bus segments that operate at different speeds must have link master capabilities at the lower speed segment side of the bridge. The hosts 12 and 15, the PLC 13, and the controllers 14 may be any type of fieldbus device but, typically, will be link master devices.

Each of the devices 12–32 is capable of communicating over the bus 34 and, importantly, is capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block and may include zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of, for example, a function block, is controlled manually; an out-of-service mode in which the block does not operate; a cascade mode in which the operation of the block is affected from (determined by) the output of a different block; and one or more remote modes in which a remote computer determines the mode of the block. However, other modes of operation exist in the Fieldbus protocol.

Importantly, each block is capable of communicating with other blocks in the same or different field devices over the Fieldbus bus 34 using standard message formats defined by the Fieldbus protocol. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14 of FIG. 1. Trend objects retain short-term historical data pertaining to some, for example, function block parameter and report this data to other devices or function blocks via the bus 34 in an asynchronous manner. Alert objects report alarms and events over the bus 34. These alarms or events may relate to any event that occurs within a device or one of the blocks of a device. View objects are predefined groupings of block parameters used in standard human/machine interfacing and may be sent to other devices for viewing from time to time.

Figure 2:
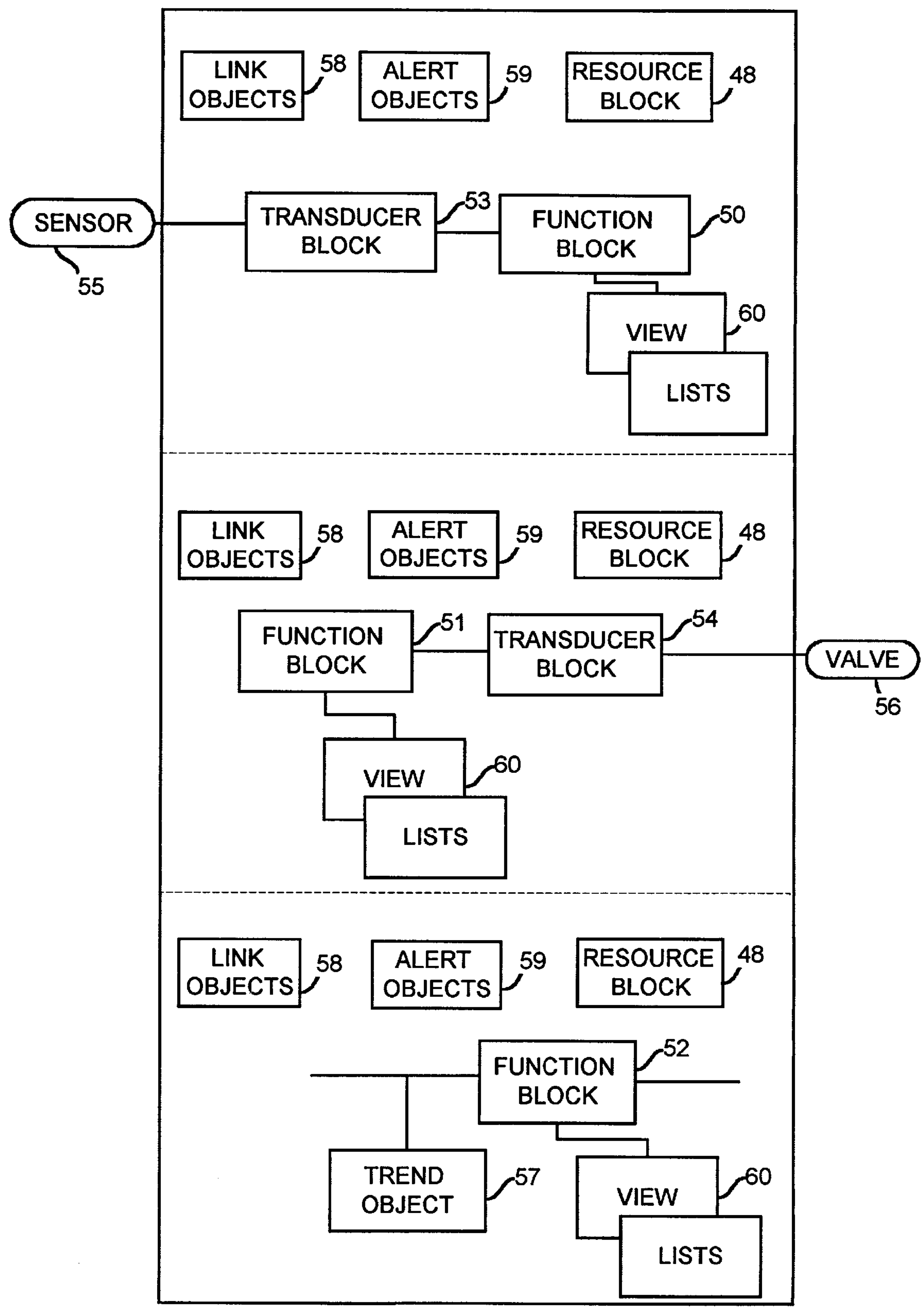
FIG. 2 is a schematic block diagram of a Fieldbus device having a set of three function blocks therein.

Referring now to FIG. 2, a Fieldbus device, which may be, for example, any of the field devices 16–28 of FIG. 1, is illustrated as including three resource blocks 48, three function blocks 50, 51, and 52 and two transducer blocks 53 and 54. One of the function blocks 50 (which may be an input function block) is coupled through the transducer block 53 to a sensor 55, which may be, for example, a temperature sensor, a set point indication sensor, etc. The second function block 51 (which may be an output function block) is coupled through the transducer block 54 to an output device such as a valve 56. The third function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, FIG. 2 is merely exemplary and other numbers of and types of block objects, link objects, alert objects, trend objects, and view objects may be provided in any field device.

Figure 3:
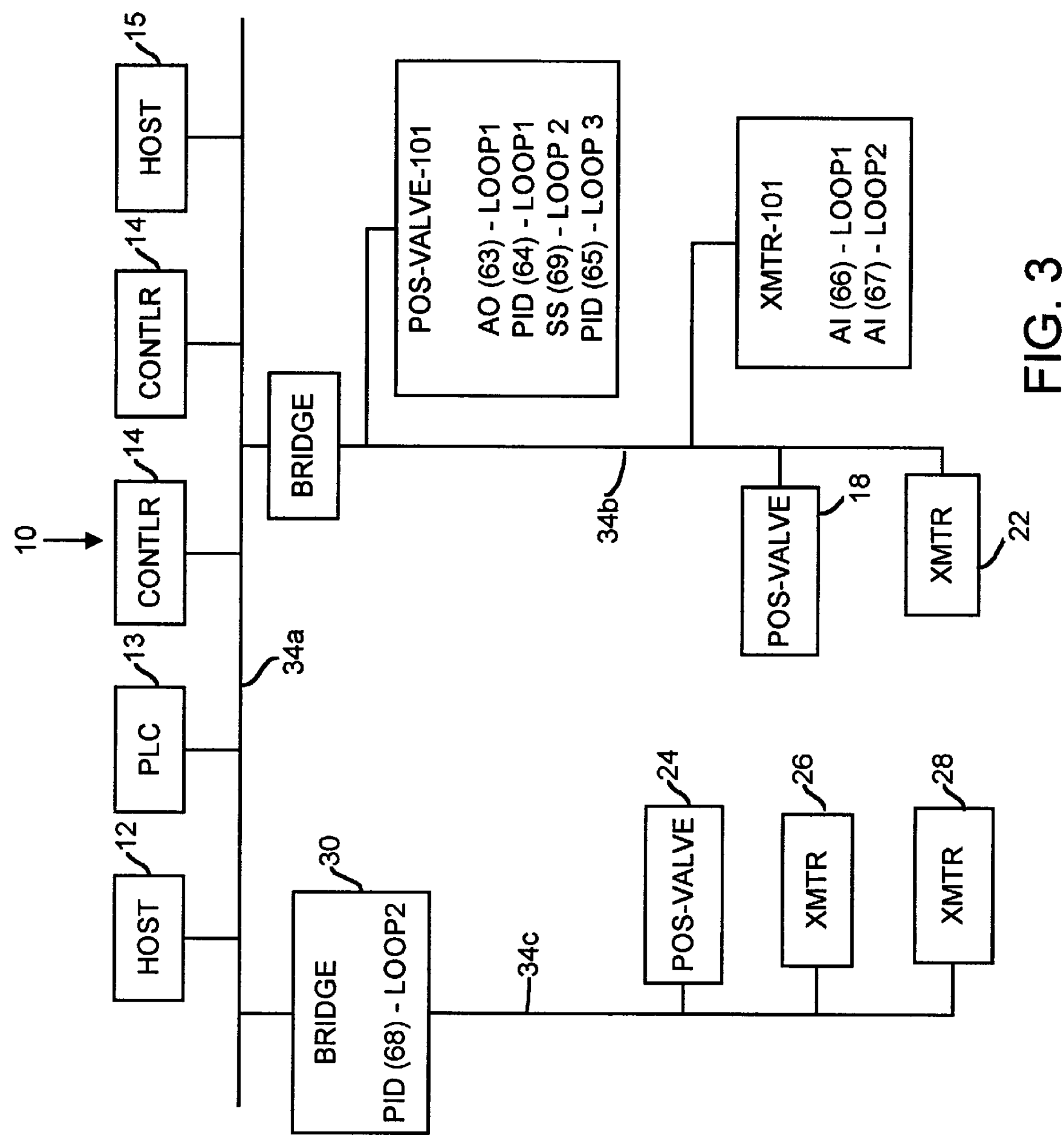
FIG. 3 is a schematic block diagram illustrating the function blocks within some of the devices of the process control network of FIG. 1.

Referring now to FIG. 3, a block diagram of the process control network 10 depicting the devices 16, 18, and 24 as positioner/valve devices and the devices 20, 22, 26, and 28 as transmitters also illustrates the function blocks associated with the positioner/valve 16, the transmitter 20, and the bridge 30. As illustrated in FIG. 3, the positioner/valve 16 includes a resource (RSC) block 61, a transducer (XDR) block 62, and a number of function blocks including an analog output (AO) function block 63, two PID function blocks 64 and 65, and a signal select (SS) function block 69. The transmitter 20 includes a resource block 61, two transducer blocks 62, and two analog input (AI) function blocks 66 and 67. Also, the bridge 30 includes a resource block 61 and a PID function block 68.

As will be understood, the different function blocks of FIG. 3 may operate together (by communicating over the bus 34) in a number of control loops and the control loops in which the function blocks of the positioner/valve 16, the transmitter 20, and the bridge 30 are located are identified in FIG. 3 by a loop identification block connected to each of these function blocks. Thus, as illustrated in FIG. 3, the AO function block 63 and the PID function block 64 of the positioner/valve 16 and the AI function block 66 of the transmitter 20 are connected within a control loop indicated as LOOP1, while the SS function block 69 of the positioner/valve 16, the AI function block 67 of the transmitter 20, and the PID function block 68 of the bridge 30 are connected in a control loop indicated as LOOP2. The other PID function block 65 of the positioner/valve 16 is connected within a control loop indicated as LOOP3.

Figure 4:
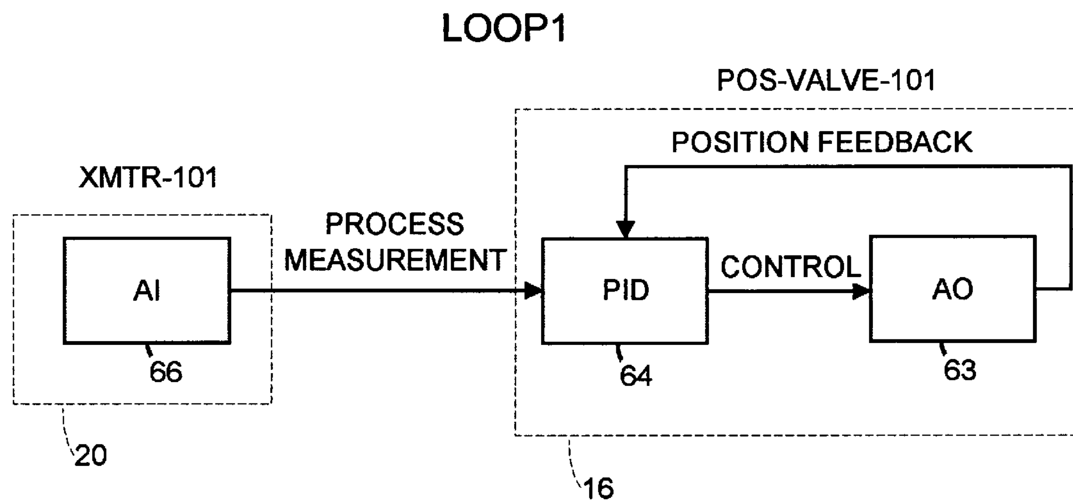
FIG. 4 is a control loop schematic for a typical process control loop within the process control network of FIG. 1.

The interconnected function blocks making up the control loop indicated as LOOP1 in FIG. 3 are illustrated in more detail in the schematic of this control loop depicted in FIG. 4. As can be seen from FIG. 4, the control loop LOOP1 is completely formed by communication links between the AO function block 63 and the PID function block 64 of the positioner/valve 16 and the AI function block 66 of the transmitter 20 (FIG. 3). The control loop diagram of FIG. 4 illustrates the communication interconnections between these function blocks using lines attaching the process and control inputs and outputs of these functions blocks. Thus, the output of the AI function block 66, which may comprise a process measurement or process parameter signal, is communicatively coupled via the bus segment 34*b* to the input of the PID function block 64 which has an output comprising a control signal communicatively coupled to an input of the AO function block 63. An output of the AO function block 63, which comprises a feedback signal indicating, for example, the position of the valve 16, is connected to a control input of the PID function block 64. The PID function block 64 uses this feedback signal along with the process measurement signal from the AI function block 66 to implement proper control of the AO function block 63. Of course the connections indicated by the lines in the control loop diagram of FIG. 4 may be performed internally within a field device when, as with the case of the AO and the PID function blocks 63 and 64, the function blocks are within the same field device (e.g., the positioner/valve 16), or these connections may be implemented over the two-wire communication bus 34 using standard Fieldbus synchronous communications. Of course, other control loops are implemented by other function blocks that are communicatively interconnected in other configurations.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 6. There is no corresponding structure for OSI layers 3–5 in the Fieldbus protocol. However, the applications of a fieldbus device comprise a layer 7 while a user layer is a layer 8, not defined in the OSI protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus 34 and manages access to the bus 34 according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus 34. During the decoding process, the data link layer recognizes special codes within the preamble, such as start delimiters and end delimiters, to identify the beginning and the end of a particular Fieldbus message and may perform a checksum to verify the integrity of the signal or message received from the bus 34. Likewise, the data link layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16, and 26) operates as a link active scheduler (LAS) that actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34*b*) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each function block active on any particular segment of the bus 34 and one or more asynchronous communications for one or more of the functions blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. The execution times and the amount of time necessary to complete execution of each function block are stored in the management information base (MIB) of the device in which the function block resides while, as noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the devices connected to the bus 34.

To effect communications during each macrocycle, the LAS, for example, the LAS 16 of the bus segment 34*b*, sends a compel data command to each of the devices on the bus segment 34*b* according to the list of transmit times stored in the link active schedule. Upon receiving a compel data command, a function block of a device publishes its output data on the bus 34 for a specific amount of time. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data using a time-stamp.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Figure 5:
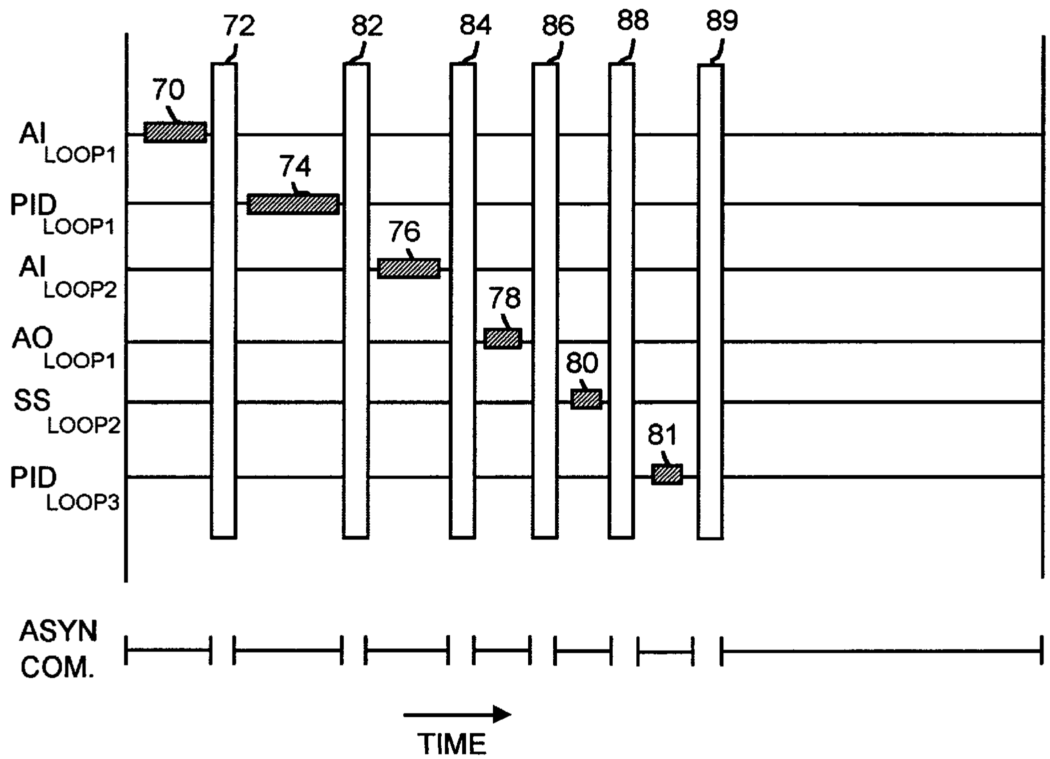
FIG. 5 is a timing schematic for a macrocycle of a segment of the bus of the process control network of FIG. 1.

FIG. 5 illustrates a timing schematic depicting the times at which function blocks on the bus segment 34*b* of FIG. 1 execute during each macrocycle of the bus segment 34*b* and the times at which synchronous communications occur during each macrocycle associated with the bus segment 34*b*. In the timing schedule of FIG. 5, time is indicated on the horizontal axis and activities associated with the different function blocks of the positioner/valve 16 and the transmitter 20 (of FIG. 3) are illustrated on the vertical axis. The control loop in which each of the functions blocks operates is identified in FIG. 5 as a subscript designation. Thus $AI_{LOOP1}$ refers to the AI function block 66 of the transmitter 20, $PID_{LOOP1}$ refers to the PID function block 64 of the positioner/valve 16, etc. The block execution period of each of the illustrated function blocks is depicted by a cross-hatched box while each scheduled synchronous communication is identified by a vertical bar in FIG. 5.

Thus, according to the timing schedule of FIG. 5, during any particular macrocycle of the segment 34*b* (FIG. 1), the $AI_{LOOP1}$ function block executes first for the time period specified by the box 70. Then, during the time period indicated by the vertical bar 72, the output of the $AI_{LOOP1}$ function block is published on the bus segment 34*b* in response to a compel data command from the LAS for the bus segment 34*b*. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88, and 89 indicate the times that the function blocks $PID_{LOOP1}$, $AI_{LOOP2}$, $AO_{LOOP1}$, $SS_{LOOP2}$, and $PID_{LOOP3}$, respectively, publish data on the bus segment 34*b*.

As will be apparent, the timing schematic of FIG. 5 also illustrates the times available for asynchronous communication activities, which may occur during the execution times of any of the function blocks and during the time at the end of the macrocycle during which no function blocks are executing and when no synchronous communication is taking place on the bus segment 34*b*. Of course, if desired, different function blocks can be intentionally scheduled to execute at the same time and not all function blocks must publish data on the bus if, for example, no other device subscribes to the data produced by a function block.

Field devices are able to publish or transmit data and messages over the bus 34 using one of three virtual communication relationships (VCRs) defined in the Fieldbus access sublayer of the stack of each field device. A client/server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgements, and device uploads and downloads.

A report distribution VCR is used for queued, unscheduled, user initiated, one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

As noted above, the communication interconnections between the field devices and the function blocks thereof are determined by a user and are implemented within the process control network 10 using a configuration application located in, for example, the host 12. However, after being configured, the process control network 10 operates without any consideration for device or process diagnostics and, therefore, interfaces with the host 12 to perform standard I/O functions, but not diagnostic functions.

When a user wishes to perform diagnostics, the user may have the host 12 send set point changes to, for example, the AO function block 63 of the control LOOP1 and record feedback in the AO function block 63 using a trend object associated with the AO function block 63. However, to perform this type of communication, the host 12 must use asynchronous (non-published) communications which allow the host 12 access to the bus 34 only when the host 12 receives a pass token message from an LAS. As a result, the different parts of the diagnostic signal generated by the host 12 may not reach the AO function block 63 at precisely determined times (or precisely scheduled times) which means that the diagnostic signal received at the AO function block 63 will have a shape that is, at least in part, determined by the communications backlog on the bus 34 at any particular time. For this reason, any diagnostic signal sent using asynchronous communications will not be strictly deterministic and, thus, may not be very effective in performing diagnostics on a device or a process. Furthermore, the host 12 has no way of guaranteeing that the feedback data collected by the trend object(s) will not be lost due to overwrites, etc. Also, the host 12 has no way of controlling the mode of the other function blocks in LOOP1, such as the PID function block 64, without specifically changing the mode of that block.

Until now, in order to assure complete and strictly deterministic diagnostics in a process, a user had to take the process control network 10 off-line and reconfigure the communication interfaces therein so that the host 12 was able to send set point changes to the appropriate devices and receive data measured by appropriate devices via synchronous communications. However, as noted above, this procedure shuts the process down and requires, that an operator reconfigure the process control network whenever diagnostics are to be performed, both of which are undesirable. Furthermore, the control implemented by the host 12 during this diagnostic procedure is different than the control being implemented by the communicatively linked function blocks during normal operation of the process and, therefore, collected process data may not be indicative of the operation of the process while the process is being controlled normally.

To overcome these disadvantages in, for example, a Fieldbus process control network, a device or process diagnostic procedure is stored in and implemented from a field device and may be used to perform device and/or process diagnostics on that device or using that device. The diagnostic procedure, which may be implemented as a function block, is configured to communicate with function blocks or other components of the device in which it is located and of receiving data, such as measurements of device parameters or other process parameters, over, for example, the bus 34 using synchronous periodic communications (e.g., the publisher/subscriber VCR of Fieldbus protocol). In this manner, the diagnostic routine is capable of deterministically controlling the device in which it is located and of receiving and storing data pertaining to a device or a process parameter in a periodic manner.

Figure 6:
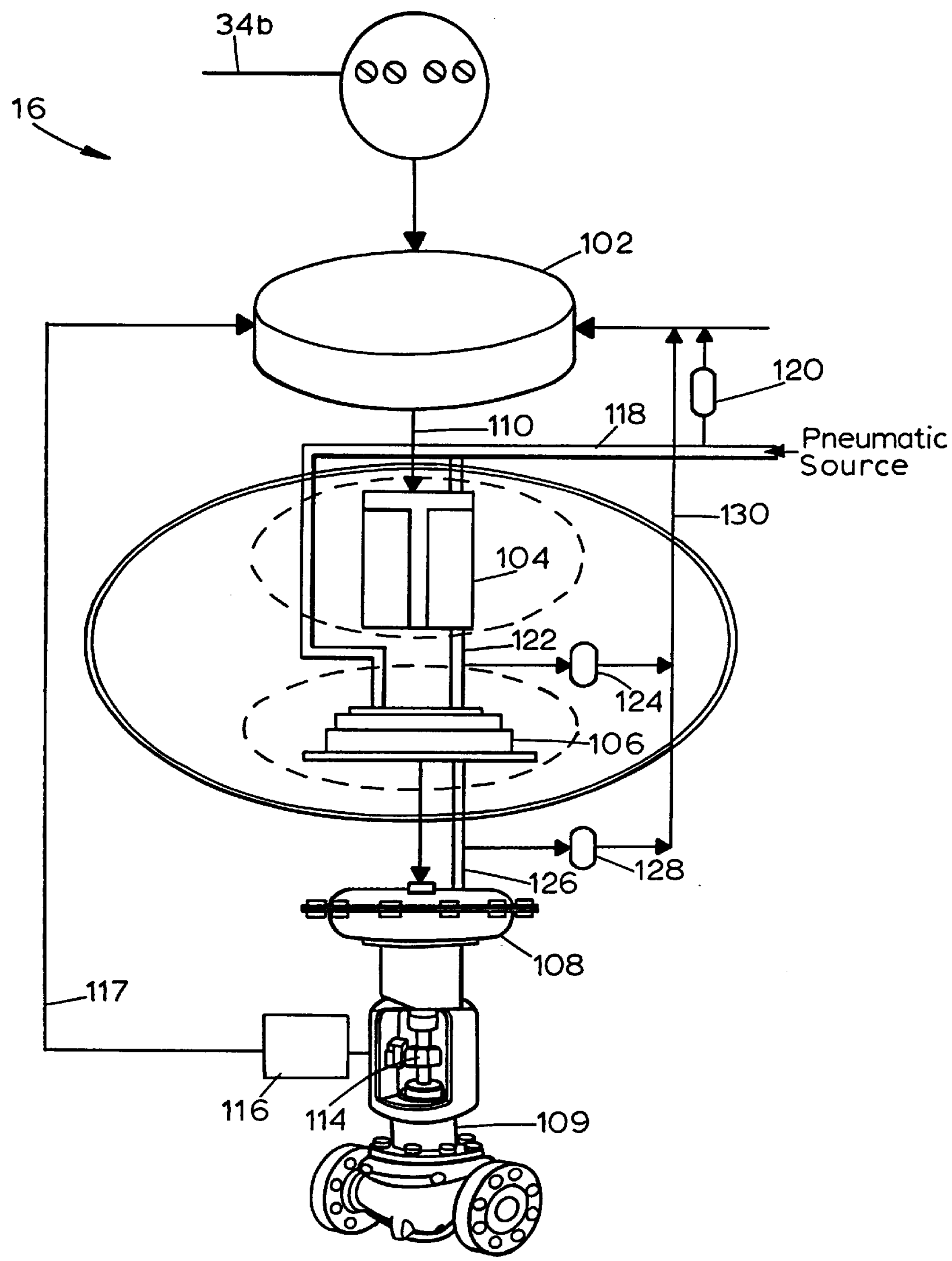
FIG. 6 is a schematic block diagram showing a digital field device having a two-wire, loop-powered, two-way digitally-communicating positioner.

Referring to now to FIG. 6, a schematic block diagram illustrates the digital field device 16 (of FIG. 3) which is a two-wire, loop-powered, two-way digitally-communicating positioner/valve combination. The digital field device 16 includes a field device controller 102, an I/P transducer 104, a pneumatic relay 106, an actuator 108, and a valve 109, which are interconnected by various pneumatic and electrical lines.

The field device 16 receives operating signals and transmits status information and data in digital form via the two-wire bus segment 34*b*, preferably according to the Fieldbus standard, and is, therefore, a two-wire positioner. Similarly, the field device 16 receives power, primarily for driving the device controller 102 and the I/P transducer 104, via the two-wire continuous loop bus segment 34*b* and is, therefore, a loop-powered device.

As illustrated in FIG. 6, the I/P transducer 104 is electrically connected to the device controller 102 by an I/P transducer control line 110 and, in the illustrated embodiment, communicates with the device controller 102 using analog control signals.

The I/P transducer 104 generates a pneumatic signal that causes actuation of the valve 109 and is highly useful in electromechanical devices for converting electrical signals to air pressure for a pneumatic positioner. The actuator 108 controls the position of a valve member 114 (which may be a valve stem) of the valve 109 while a position sensor 116 senses the position of the valve member 114 and generates a feedback signal that is communicated to the device controller 102 via a signal line 117. This position signal may be used by the device controller 102 to control the operation of the field device 16 so that the I/P transducer 104 drives the pneumatic pressure in a manner that causes the valve member 114 to be at a desired position. Position and other feedback information may be stored in a storage unit or a memory of the device controller 102 and externally accessed via the bus 34.

As is standard, the field device 16 receives a supply of pressurized air from an external source (not shown) via a pneumatic line 118 connected to the I/P transducer 104 and to the pneumatic relay 106. An input sensor 120 typically positioned between the external air source and the I/P transducer 104 measures the input pneumatic supply pressure in the pneumatic line 118 and delivers this measurement to the device controller 102. The I/P transducer 104 is connected to the pneumatic relay 106 via a pneumatic control line 122 and an I/P sensor 124 is positioned between the I/P transducer 104 and the pneumatic relay 106 to measure the pneumatic supply pressure in the line 122. Likewise, the pneumatic relay 106 is connected to the actuator 108 via a pneumatic actuation line 126 and a relay sensor 128 is positioned between the pneumatic relay 106 and the actuator 108 to measure the pneumatic supply pressure in the line 126. The pneumatic lines 118, 122 and 126 are considered parts of a single pneumatic line interconnecting the transducer 104 and the valve 109.

During operation, the device controller 102 controls actuation of the valve 109 by controlling the I/P transducer 104 to set a controlled valve operating pressure in the pneumatic control line 126. The device controller 102 sends a control signal to the I/P transducer 104 via the I/P transducer control line 110 to control an output pressure of the I/P transducer 104 and relay 106 combination to be between about 3–100 psi (0.21–7.06 kscm) which is applied to a control input of the actuator 108. The actuator 108 generates an output pressure that is applied to operate the valve 109.

Thus, as is known, the I/P transducer 104 converts electrical signals into a pneumatic air pressure signal. One example of a suitable I/P transducer 104 is described in U.S. Pat. No. 5,439,021, entitled "Electro-Pneumatic Converter," issued to B. J. Burlage et al, on Aug. 8, 1995, which is hereby incorporated by reference herein in its entirety. Likewise, the pneumatic relay 106, which serves as a pneumatic amplifier, is controlled by the I/P transducer 104 as directed by the device controller 102 to increase the air pressure of the pneumatic actuation signal line 126 a controlled amount. Thus, generally speaking, the pneumatic relay 106 supplies a controlled output pressure to a load or utilization device, such as an actuator or a piston, in response to a control signal from the device controller 102. A suitable relay is described in U.S. Pat. No. 4,974,625, entitled "Four Mode Pneumatic Relay," issued to S. B. Paullus et al, on Dec. 4, 1990, which is hereby incorporated by reference herein in its entirety. In the illustrated embodiment, the relay 106 is a multi-functional four-mode pneumatic relay that is configurable for any combination of direct/snap, direct/proportional, reverse/snap, or reverse/proportional operation. In the proportional mode, the pneumatic relay 106 develops a pressure output that is proportional to a pressure or force input. In an on/off or snap mode, the pneumatic relay 106 generates a constant pressure output, usually equal to the pressure of the applied supply, in response to the application of a defined range of force or pressure control inputs. In a direct mode of operation, the output pressure of the pneumatic relay 106 increases with an increasing input signal. In a reverse mode of operation, the relay output pressure decreases with an increasing input signal.

The input sensor 120, the I/P sensor 124, and the relay sensor 128 are pressure transducers that contain a pressure-to-electrical signal converter for converting a pressure signal to an electrical signal and supply feedback signals to the device controller 102 via a line 130. The I/P sensor 124 is diagnostically useful for detecting failure of either the I/P transducer 104 or the pneumatic relay 106 and determining, for example, whether a failure is a mechanical failure or an electrical failure. The I/P sensor 124 is also useful for detecting some system problems including a determination of whether the air pressure input to the digital field device 16 is sufficient. As a result, the I/P sensor 124 allows the status of the I/P transducer 104 and the pneumatic relay 1106 to be rapidly diagnosed so that these devices can be replaced quickly, if necessary.

In one embodiment, a suitable valve 109 for use in the digital field device 16 is a valve and actuator assembly using a spring and diaphragm actuator on a sliding stem valve which is used in an analog device described in U.S. Pat. No. 4,976,144, entitled "Diagnostic Apparatus and Method for Fluid Control Valves," issued to W. V. Fitzgerald, on Dec. 11, 1990, which is hereby incorporated by reference herein in its entirety. In this exemplary embodiment, a pressure signal of about 3 psi (0.21 kscm) is provided to the actuator 108 in response to an approximate 4 mA signal applied by the device controller 102 to the I/P transducer 104, resulting in a corresponding pressure in the pneumatic actuation signal line 126 that is insufficient to move the valve 109 from a fully opened position. If the field device controller 102 changes the control current applied to the I/P transducer 104 to approximately 20 mA, the I/P transducer 104 generates a pressure in the pneumatic actuation line 126 of approximately 15 psi (1.06 kscm), which forces the valve 109 to a fully closed position. Various positions of the valve 109 between the fully opened position and the fully closed position are attained through the operation of the device controller 102 controlling the input current applied to the I/P transducer 104 in the range from 4 mA to 20 mA.

The device controller 102 performs relatively high-speed digital communications to receive control signals and to transmit position and pressure information to an external processor or workstation in the process control network 10 via the bus 34. The device controller 102 includes storage or memory for storing the results of multiple diagnostic tests so that pertinent data are available for analysis. Diagnostic operations, such as device diagnostics, are generally in the form of software program codes and are typically encoded, stored and executed in the device controller 102 of the field device 16 in combination with program codes executing in an external device such as a processor or the host workstation 12.

A device diagnostic evaluation of the valve 109 may be performed through the operation of the device controller 102 controlling the input current applied to the I/P transducer 104 in a range sufficient to test the valve 109 between fully opened and fully closed positions. During the device diagnostic evaluation, the outputs of the input sensor 120, the I/P sensor 124, and the relay sensor 128 are monitored by the device controller 102 to sense the pneumatic pressure in the pneumatic lines 118, 122 and 126, respectively, which are used for analysis. The output of the position sensor 116 is also monitored to detect position or movement of the valve stem 114 which corresponds to a position of or motion of a valve plug (not shown) within the valve 109.

Thus, a test operating cycle of the valve 109 is performed under control of the device controller 102 by applying a controlled variable current to the I/P transducer 104, sensing the pressure within the pneumatic lines 118, 122 and 126 and sensing the position of the valve stem 114 using the position sensor 116. In this manner, the device controller 102 simultaneously receives time-varying electrical signals indicating the pressures at the illustrative locations and the position of the valve 109 and may used these signals to determine any number of device diagnostic parameters in any known or desired manner.

Conventional field devices typically do not include a position sensor, such as the sensor 116, and do not use position sensor results for diagnostic evaluations. Also, conventional field devices do not include sensors such as the input sensor 120, the I/P sensor 124, and the relay sensor 128 for measuring pressure in the pneumatic control and for converting the pressure signal to an electrical signal to facilitate diagnostic evaluation. However, these sensors and, particularly, the I/P sensor 124, improve diagnostic capabilities by facilitating localization of failure, error or fault conditions in the field device 16. In particular, the I/P sensor 124 assists in differentiation between failures of the valve 109, other failures in the field device 16, and failures external to the field device 16 including failures of pneumatic line feeding the field device 16. The I/P sensor 124 is also useful for performing a diagnostic test to determine the operational status of the I/P transducer 104, the pneumatic relay 106, the field device 16 and the process control system 10 in general. In one embodiment, the I/P transducer 104 and the pneumatic relay 106 are tested using a diagnostic test procedure that drives the I/P transducer 104 full open to measure the full air pressure provided to the valve 109. While the I/P transducer 104 is driven open, the I/P sensor 124 constantly measures pressure in the pneumatic control line 122. If the pressure begins to decrease, the test indicates that the air supply may be insufficient. A further diagnostic test of air supply sufficiency is performed by pumping the valve 109 by applying an oscillating signal to the I/P transducer 104 so that the valve 109 begins a suction action with respect to the air supply and then measuring maximum flow and maximum pressure values using the I/P sensor 124.

Figure 7:
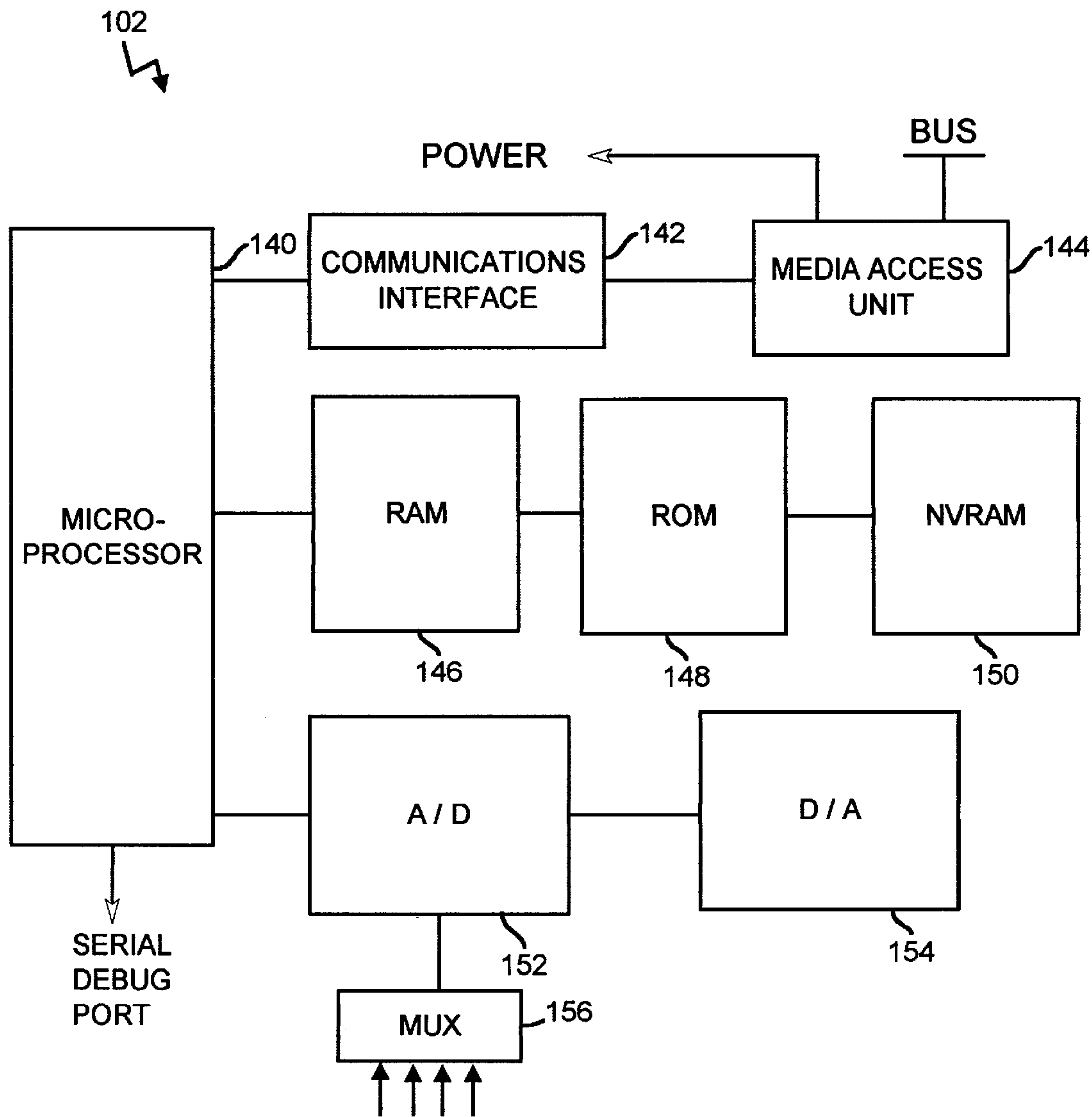
FIG. 7 is a block diagram illustrating a suitable field device controller for use in controlling the digital field device of FIG. 6.

As illustrated in FIG. 7, the device controller 102 includes a microprocessor 140, an interface 142, a bus isolation circuit 144, a plurality of storage devices such as a random access memory (RAM) 146, a read-only memory (ROM) 148 and a nonvolatile random-access memory (NVRAM) 150, and a plurality of signal processing devices such as an A/D converter 152, a D/A converter 154 and a multiplexer 156. The interface 142 (which is a bus connector) is a circuit that performs serial to parallel protocol conversion and parallel to serial protocol conversion and is used to add framing information to data packets according to any desired protocol definition, such as the Fieldbus protocol. The bus isolation circuit 144 is a circuit that is used to convert a two-wire media communication signal on the bus 34 to a digital representation of the communication signal and supplies power received from the bus 34 to other circuits in the device controller 102 as well as to the I/P transducer 104. The bus isolation circuit 144 may also perform wave-shaping and signaling on the bus 34.

The A/D converter 152 is connected to transducers such as the position and pressure transducers of the position sensor 116 and the pressure sensors 120, 124 and 128 of FIG. 6 as well as to any other desired analog input devices. Although the A/D converter 152 may have a limited number of input channels, the multiplexer 156 may be used to allow multiple signals to be sampled. If desired, the multiplexer 156 may include a bank of amplifiers connected between the signal lines 117 and 130 (FIG. 6) to amplify the position, pressure and other feedback signals delivered thereto. The D/A converter 154 performs digital to analog conversion on signals developed by the microprocessor 140 to be delivered to analog components, such as the I/P transducer 104.

In a typical diagnostic test application, the controller 102 generates a 0–30 mA output test signal to the I/P transducer 104 in, for example, a programmed ramp, step change, on/off form (or in any other desired manner) to operate the valve 109 over a predetermined range of pneumatic pressures, and receives diagnostic test output signals developed by the pressure input sensor 120, the I/P sensor 124, the relay sensor 128 and the position sensor 116. Specific test procedures may be specified at and are generally initiated externally to the field device 16 using an input/output device such as a workstation, although the procedures (and necessary information associated therewith) may also be input directly to the controller 102 using an input device such as a keyboard. If desired, however, the test procedures may be stored in the controller 102. Similarly, diagnostic test result information collected by or produced in the field device controller 102 is typically transferred to an external input/output device, although such information may also be directly displayed from the device controller 102 using, for example, a CRT display or a printer.

The field device 16 performs diagnostic test operations, such as device and process diagnostics, using a program language interpreter embedded within the controller 102 that interprets commands such as those requesting the performance of diagnostic process steps. The language interpreter is preferably implemented in a program code stored in the PROM 148 and executes in the microprocessor 140. In some embodiments, a test (diagnostic) definition or procedure is encoded into the PROM 148 and, thus, preloaded into the field device 16. In other embodiments, a test (diagnostic) definition or procedure is downloaded at or before the time that the procedure is to be run and is stored in, for example, the RAM 146 for execution by the microprocessor 140. In a typical embodiment, some diagnostic functions are hard-coded into the PROM 148 and other functions are downloaded, allowing the design and implementation of new diagnostic tests without modifying the permanent or hard-coded software in the device 16. Although the language interpreter is described within the context of the performance of process diagnostics or device diagnostics in a Fieldbus-type device (such as a Fieldbus valve), the language interpreter may be implemented in any type of embedded controller, thereby enabling the use of common diagnostic test operations in any other type of embedded controller.

During operation, the field device 16 receives instructions via the bus 34 from an operator console or host workstation 12 in the process control network 10. The language interpreter executing in the device controller 102 interprets the instructions and executes the operations defined by the instructions. In an illustrated embodiment, the language definition is depicted in a User Interface Command Table shown in TABLE 1, as follows:

TABLE 1

| | Parameter(s) |
|---|---|
| Move Absolute | Position |
| Move Relative | Offset |
| Pause | Time |
| Set Increment | Increment |
| Increment UP | |
| Increment Down | |
| Loop Start | Number of Iterations |
| Loop End | |
| Stop | |
| Data Rate | Integer Multiple of Servo Rate |
| //Comment Line | |
| Label: | |
| Call Subroutine | Subroutine Name |
| Return | |
| Test Variable | Variable, Value, Address |

In this diagnostic language specification, a user can use a command name to specify the command for execution. A comment line is any line that begins with two slashes (//), according to the standard C/C++ convention. A label is any word followed by a colon.

A diagnostic test procedure may be defined in an operator console such as in the host 12 which generates a sequence of instructions in accordance with the language definition designed to implement the diagnostic test procedure. The operator console then transmits the sequence of instructions encoded in the interpretive language via the bus 34 to the digital field device 16 using, for example, asynchronous communications in the Fieldbus protocol. The language interpreter executing in the device controller 102 stores the received instructions and interprets the instructions sequentially to control the valve 109 as directed by the instructions to thereby preform the diagnostic test. Diagnostic test procedures may, for example, control the field device 16 to repeatedly step the valve 109, move the valve 109 up or down, move the valve 109 a selected amount in a selected direction, and the like. The diagnostic test procedure also controls the collection of data from sensors in the field device 16 (as well as from other devices) and controls transmission of data to the control console or host workstation 12 via the bus 34. Of course, if desired, the diagnostic test procedures implemented by instructions provided to the controller 102 may also process the received data to determine diagnostic results and may send these results to the host 12 or to other display device.

Thus, the diagnostic language interpreter within the device controller 102 controls operation of the field device

16 according to programmed instructions to enable diagnostic test procedures to be defined external to the digital field device 16 so that diagnostic tests may be defined and modified freely without modification of the field device 16. Likewise, new diagnostic control procedures may be developed and sent to the field device 16 after the field device 16 has been installed in the process control network 10. If desired, however, the device 16 may also or alternatively implement device and/or process diagnostic test instructions stored in the device at the time of manufacture or at some other time.

A control console (such as the host 12) typically includes diagnostic development tools such as language editors and simulators for developing the control routines in the diagnostic language for execution by the field device 16. The control console also typically includes analysis tools for analyzing data received from the field device 16 via the bus 34.

For the sake of completeness, example diagnostic program codes in an interpretive language are illustrated as follows for controlling the valve 109:

Program Code

```
(1) SAMA Static Test Definition

//CYCLE 0 TO 100% 3 TIMES
DataRate 1
CYCLE:Loop 3
MoveAbsolute 0.0
Pause 10000
Move Absolute 100.0
Pause 10000
LoopEnd
//MOVE TO 50% STEP UP 4 TIMES
Move Absolute 50.0
Pause 10000
SetIncrement 10.0
UP:LOOP 4
Increment Up
Pause 10000
LoopEnd
//STEP DOWN 8 TIMES
DOWN:Loop 8
IncrementDown
Pause 10000
LoopEnd
//STEP UP 4 TIMES
UP2:Loop 4
IncrementUp
Pause 10000
LoopEnd
Stop
(2) Step Change Test Definition

DataRate 1
MoveAbsolute 50.0
Pause 10000
MoveAbsolute 60.0
Pause 10000
Stop
(3) Stepped Ramp Test Definition

DataRate 1
MoveAbsolute 50.0
SetIncrement 0.5
//STEP UP BY 0.5 FOR 10 TIMES
UP1: Loop 10
IncrementUP
Pause 1000
LoopEnd
//STEP DOWN BY 0.5 FOR 10 TIMES
DOWN1: Loop 10
IncrementDown
Pause 1000
```

-continued

Program Code

```
LoopEnd
SetIncrement 1.0
//STEP UP BY 0.5 FOR 10 TIMES
UP2: Loop 10
IncrementUp
Pause 1000
LoopEnd
//STEP DOWN BY 0.5 FOR 10 TIMES
DOWN2: Loop 10
IncrementDown
Pause 1000
LoopEnd
SetIncrement 2.0
//STEP UP BY 0.5 FOR 10 TIMES
UP3: Loop 10
IncrementUp
Pause 1000
LoopEnd
//STEP DOWN BY 0.5 FOR 10 TIMES
DOWN3: Loop 10
IncrementDown
Pause 1000
LoopEnd
Stop
(4) Step Study Test Definition

DataRate 1
//STEP UP, DOWN, DOWN, UP, THEN INCREMENT STEP SIZE AND
//REPEAT UNTIL CHANGES DETECTED.
SetIncrement 0.5
IncrementUp
Pause 100
IncrementDown
Pause 100
IncrementDown
Pause 100
Increment Up
Pause 100
SetIncrement 1.0
IncrementUp
Pause 100
IncrementDown
Pause 100
IncrementDown
Pause 100
IncrementUp
Pause 100
SetIncrement 2.0
IncrementUp
Pause 100
IncrementDown
Pause 100
IncrementDown
Pause 100
IncrementUp
Pause 100
SetIncrement 5.0
IncrementUp
Pause 100
IncrementDown
Pause 100
IncrementDown
Pause 100
IncrementUp
Pause 100
Stop
```

The first above-identified test (1) cycles three times, performs four steps from the half open position, steps down eight times and steps up four times. The second test (2) performs a step change from 50 to 60 percent of the absolute position of the valve. The third test (3) performs three cycles of a stepped ramping waveform starting at 50 percent of the absolute position of the valve. The fourth test (4) repeats a series of steps with increasing magnitudes until a change in the valve is detected.

In these routines, the field device controller 102 implements a Conditional pause to stop recording and sets a bit in a storage location to indicate where a test is stopped. The field device controller 102 also implements a Branch/GOTO statement, a Loop forever statement, and a forced stop when an out-of-service flag is set. The pauses are synchronized with servo run times to that the test does not get out of synch with the valve.

The illustrative program code depicts only some examples of the types of diagnostic tests that may be executed by the field device 16, there being many other diagnostic tests that may be performed by program instructions provided to the field device 16 including, for example, a static cycle test in which the valve 109 is moved 10% up, 10% down, 10% up, 10% down, and so on for a plurality of cycles. Likewise, any device diagnostic measurements may be made including, for example, simple measurements of valve travel or pressures within the device 16 as developed by the sensors 116, 120, 124 and 128 and/or any desired parameters derived from these or other measurements including, for example, (1) a dynamic error band, which is a plot of travel (e.g., the output of the position sensor 116) versus input (e.g., the control signal delivered to the controller 102), (2) a plot of the drive signal (which is the output of the controller 102 as delivered to the I/P transducer 104) versus a pressure measurement, (3) a plot of drive signal versus input signal, (4) output signal, which is plot of travel versus drive signal, (5) valve signature, which is plot of pressure versus travel, etc. Of course the pressure signals specified in these tests may be any desired pressure signals, such as those measured by any of the sensors 120, 124 and/or 128.

Although the diagnostic language and diagnostic language interpreter is advantageously implemented in a process control network 10 using Fieldbus communications for communicating to a digital field device 16 in the form of a two-wire, loop-powered, two-way digitally-communicating positioner, the language interpreter may be implemented in other embodiments. For example, the diagnostic language interpreter may be implemented in any embedded controller that communicates using any desired communication technology such as digital, analog, optical and the like. Furthermore, although the illustrated diagnostic language interpreter communicates according to the Fieldbus standard protocol, alternative embodiments of the diagnostic language interpreter may be implemented in an embedded controller that communicates using other communication protocols including, for example, the HART, Profibus, etc. protocol and in systems that uses other than two-wire buses, such as systems that use four-wire buses. Likewise, the diagnostic language interpreter may be implemented and used in other types of valves including, for example, electronic and hydraulic valves, as well as in other types of devices besides valve devices.

Moreover, although the diagnostic language and diagnostic language interpreter are described as defining a particular instruction set, other instruction sets may be implemented according to the specifications of the embedded controller within which the language and interpreter are defined.

Of course, both device and process diagnostic tests may be performed by issuing a command requesting one or more specific diagnostic test procedures at an operator console such as the host workstation 12. In the illustrated embodiment, the diagnostic test procedures are implemented in two software program codes. A first code executes in a processor external to the field device 16, for example, in the host workstation 12, to create or initiate a diagnostic test and to receive collected data and perform analysis thereon, while a second code executes in the device controller 102 to implement a diagnostic test stored therein or provided by the host 12 in the form of program instructions. In contrast, diagnostics in a conventional control system network are performed solely by software executing in a processor of a control console. Many advantages are gained by executing diagnostic tests at the field device level rather than at a control console level. For example, diagnostic testing may be performed in parallel and may be distributed among many field devices by executing these tests at the device level. Likewise, a more accurate test may be performed in process control networks having distributed control functions, such as in the Fieldbus protocol, where a host may not be able to deterministically control operation of the field device due to the fact that the host must communicate with the field device in an asynchronous manner to perform a diagnostic test.

Implementation of the two-way digital-communication defined by the Fieldbus protocol is highly advantageous for improving the speed of diagnostics, both through an increase in data throughput and by facilitating parallel performance of diagnostics among a plurality of field devices. Using the Fieldbus protocol, regularly scheduled messages are transferred at prescheduled times and unscheduled messages, including diagnostic messages and data, calibration information and other information such as status indications, are transferred when the messages or data are ready and the field device bus 34 is not otherwise busy. Diagnostic request messages are received by target field devices and diagnostic tests are performed by the field devices asynchronously with respect to operations of other field devices. When a diagnostic test operation is complete, a field device returns a response, such as result data, when the field device bus 34 is available. Accordingly, as noted above, a plurality of field devices may perform diagnostic tests in parallel.

Figure 8:
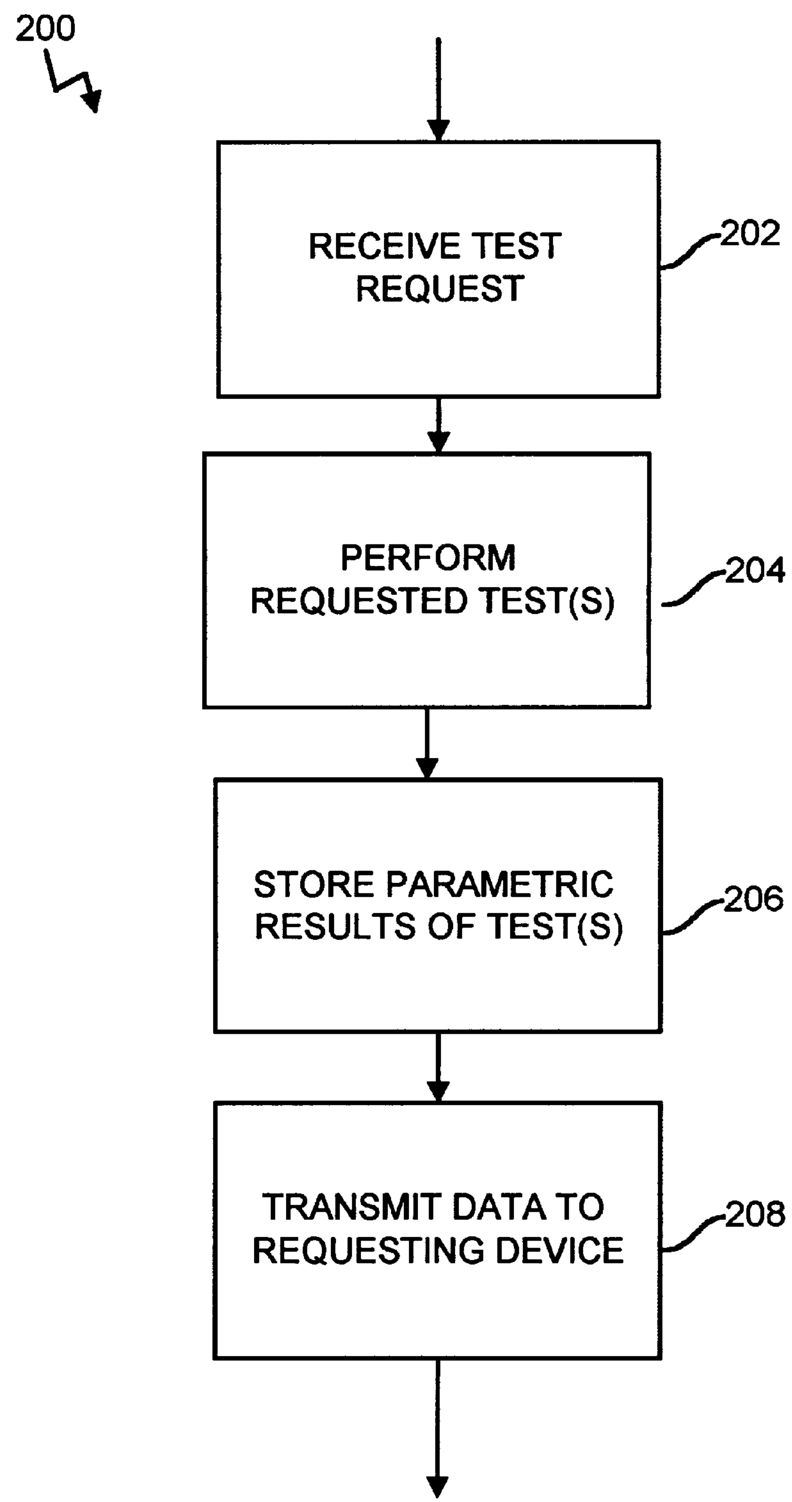
FIG. 8 is a flow chart illustrating a technique for performing diagnostic tests.

Referring now to FIG. 8, a flow chart 200 illustrates a technique for performing diagnostic tests within the field device 16. At a step 202, the field device 16 receives a request to perform a sequence of instructions implementing one or more diagnostic tests. Of course, the host workstation 12 may issue such requests to any one or to a multiplicity of field devices simultaneously and allow each field device to collect diagnostic data in parallel. If a multiplicity of field devices are performing tests simultaneously, the workstation 12 may collect data over an extended time interval as rapidly as the diagnostic tests are performed and the results are made available on the bus 34 by the individual field devices. Conventional devices using a unique set of wires to communicate with each field device only access a single field device at one time and only perform a single test for the single field device at one time.

At a step 204, the field device 16 performs a series of instructions to implement the one or more diagnostic tests as directed by the request. Of course, as noted above, the instructions may be stored in the memory of the field device 16 or may be provided to the field device by the host 12 via, for example, asynchronous communications. While the test is being implemented, one or more parameters such as valve travel, pressure, etc. are measured in parallel. Thus, while conventional field devices typically receive a command for a single diagnostic test measurement, perform the measurement serially, and respond to the request with a single measurement value due to the limited communication bandwidth and the lack of storage capability in these field devices, the field device 16 may receive a request for a plurality of tests using a flexible test protocol, may perform the plurality of tests, and then respond with the results collected during the tests.

At a step 206, the field device 16 stores parametric results of the plurality of tests measured for each of the diagnostic tests in a memory and, at a step 208, transmits the data to the external requesting device. Two-wire, two-way digital communication in accordance with the Fieldbus standard substantially improves the test result throughput of the digital field device 16. In fact, digital communications using Fieldbus protocol improves data transmission time by approximately thirty times over HART systems so that, when the Fieldbus protocol is used to perform diagnostic tests on multiple field devices in parallel, the amount of diagnostic test time for a process control network including many field devices is greatly reduced.

While conventional field devices typically have a separate pair of wires connecting each field device to a network so that each field device has exclusive access to the wires, in the illustrated embodiment, results of the diagnostic tests are transmitted to the operator console or the host workstation 12 over the bus 34 using the Fieldbus standard protocol which reduces the amount of wire required to communicate with the host 12.

As will be understood, during a diagnostic test procedure, the microprocessor 140 controls the D/A converter 154 to supply a varying control signal to the I/P transducer 104. For each particular control signal value and sample time, the microprocessor 104 directs the A/D converter 152 to measure the pressure and/or position related electrical signals developed by the sensors 116, 120, 124 and 128 (as well as any other signals from other sensors). As the microprocessor 104 directs the field device controller 102 through an operating measurement cycle, pressure and valve travel information are accessed by the device controller 102 and are processed or stored. The collected data is often temporarily stored in the RAM 146 and is communicated to an external device, such as a host workstation 12, often for subsequent processing, analysis and display. Of course, the microprocessor 140 may also perform analysis if desired.

For example, pressure information measured by the relay sensor 128 and position information measured by the position sensor 116 may be analyzed in combination to determine the change in valve diaphragm pressure as a function of valve position. Similarly, pressures measured by the input sensor 120, the I/P sensor 124 and the relay sensor 128 may each be analyzed in combination with the position measured by the position sensor 116 to generate a deviation cycle showing a complete analysis of the operation of the valve 109 including characteristics of linearity, hysteresis and range.

Figure 9:
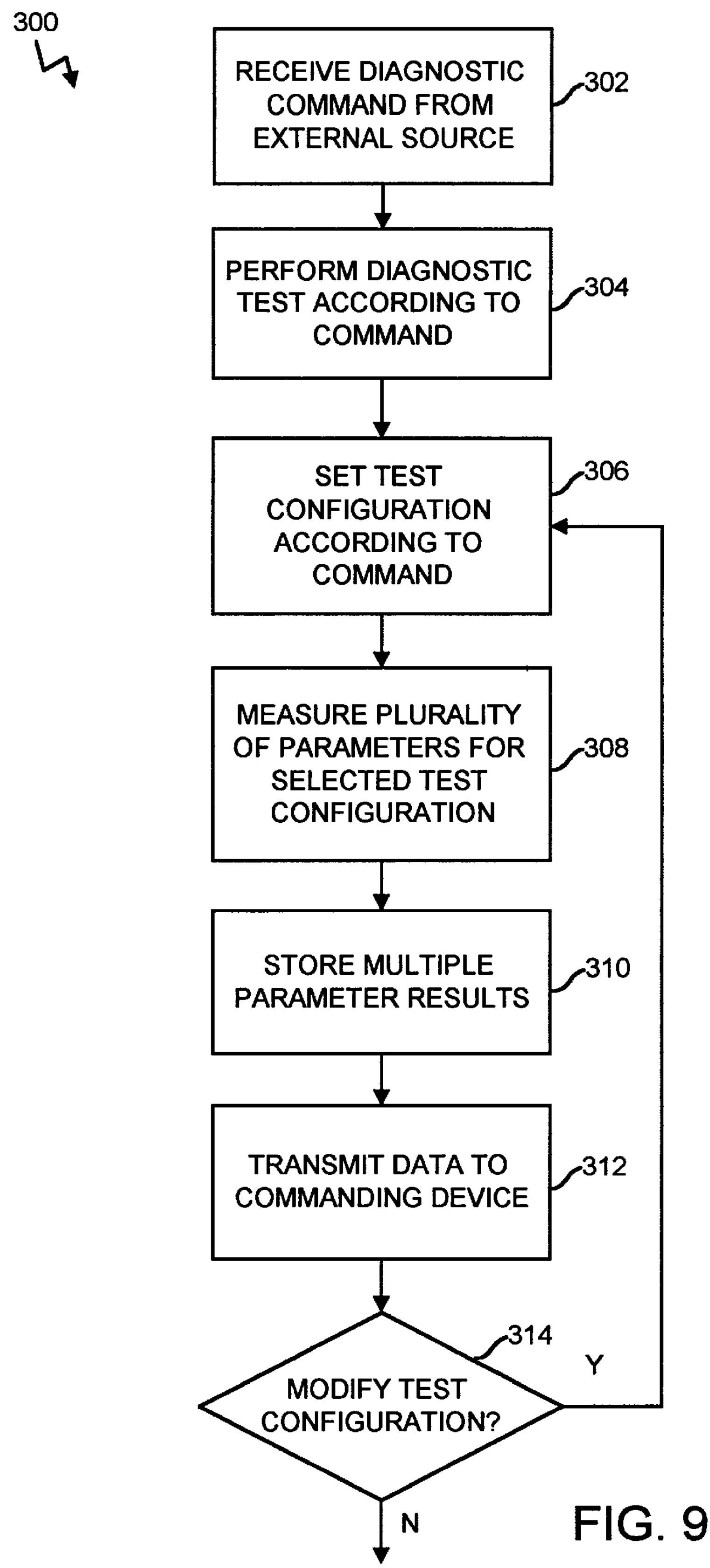
FIG. 9 is a flow chart illustrating a diagnostic test protocol for testing the digital field device of FIG. 6.

Referring to FIG. 9, a flow chart 300 illustrates a diagnostic test protocol implemented in the field device 16 to perform a diagnostic test. An operator generates a sequence of diagnostic instructions at an operator console such as the workstation 12 and transmits the diagnostic instructions to the field device 16 which stores these instructions in memory. Alternatively, or in addition, diagnostic instructions may be stored in the memory of the field device 16 during manufacture of the device.

At a step 302, the field device 16 receives a diagnostic command via the field device bus 34. If desired, the diagnostic command may be in the form of instructions in an interpretive diagnostic language encoded for execution in the field device controller 102 or may be an instruction to initiate instructions already stored within the device 16. The device controller 102 executes the various instructions to cause control elements in the digital field device 16 such as the I/P transducer 104 and the actuator 108 to manipulate the valve 109 and to cause sensors such as the input sensor 120, the I/P sensor 124, the relay sensor 128 and the position sensor 116 to perform measurements. The control instructions may also include instructions for processing the measurements and formatting data for presentation to a user. Additional instructions may cause the field device controller 102 to send processed or formatted data to the requester via the field device bus 34.

At a step 304, the digital field device 16, upon request, performs a test procedure in which, for example, the valve 109 is exercised from a full-closed status to full-open, then back to a full-closed status. Likewise, the digital field device 16 may, upon request, perform a plurality of step tests including, for example, a single step movement and analysis, and a ten-step movement and response measurement. A stepped ramp test may be also be used and involves a series of steps from a slight opening to a large opening of the valve, such as a ramp ranging from 10% to 90% in steps of, for example, 10% increments. A stepped study involves opening the valve in predefined steps, such as 1 %, 2%, 5% and 10%, moving the valve in a first direction a specified step size, stabilizing, and then moving the valve in a second direction at the specified step size.

At a step 306, the physical configuration of a diagnostic test is set by commands communicated to the digital field device 16. The physical configuration variables include a drive signal applied to the actuator 108, a pressure setting applied to the I/P transducer 104, as well as actuator pressure and a valve travel reading. The physical configuration variables may be set as independent test variables in some diagnostic tests and monitored as dependent parameters in other tests.

At a step 308, the field device 16 measures predetermined parameters for a particular physical test configuration. For many diagnostic tests, multiple parameters are measured for a single test configuration. Typical parameters that are measured using a single test configuration include valve position, process variable, actuator air pressure, supply pressure, drive signal, transducer set point and I/P air pressure, to allow determination of, for example, valve signature, output signal, dynamic error band, drive versus pressure, and travel versus input signal amplitude.

At a step 310, the field device 16, through the operation of the device controller 102, stores the multiple parameters for a single test configuration in, for example, the RAM 146. At a step 312, the data is communicated to the host 12 or other device. If testing is to be performed using a different diagnostic test configuration, the field device 16, through the operation of the device controller 102 in a conditional step 314, loops back to the step 306 to modify the test configuration.

The diagnostic tests in the illustrated field device 16 are substantially improved in comparison to convention field devices in part through improvements in the diagnostic protocol structure, in part through improvements in communication, and in part through the implementation of additional sensors in the field device 16. The improvements in diagnostic protocol structure enable the field device 16 to measure multiple parameters for a single test configuration. The distribution of diagnostic control operations to the field devices enable diagnostic tests to be completely controlled, upon request, within a field device so that multiple requests may be made to multiple field devices with the individual field devices controlling the diagnostic tests independently and in parallel to one another. The improvements in diagnostic protocol structure also advantageously enable the test procedures to be modified external to the field device by programming changes. Accordingly, new diagnostic capabilities may be added and wholesale changes in diagnostic operations may be made without modifying the field device. Modification of a field device is highly disadvantageous due to the tremendous expense of shutting down a process line. The improvements in communication enable the field device 16 to measure multiple parameters for a single test configuration. Conventional field devices receive a request on communication lines that are dedicated to a specific field device, set a test configuration according to the specifications of the request, and return a single test measurement according to the request. A subsequent measurement under the same test configuration is made by repeating the step, including the redundant step of setting the test configuration. The improved communications of the illustrated field device 16 advantageously allow diagnostic testing of multiple devices in parallel, increasing diagnostic test throughput. Furthermore, the improved digital communications provide for a plurality of data types where analog communications (of conventional field devices) do not.

While the invention has been described with reference to various embodiments, it will be understood that these embodiments are illustrative and that the scope of the invention is not limited to them. Many variations, modifications, additions and improvements of the embodiments described are possible. For example, the field device 16 is but one illustration of a suitable control valve and actuator combination. Other suitable valve types include sliding stem, rotary plug, rotary ball, butterfly, eccentric disk valves as well as other known valve types. Other suitable actuators include spring and diaphragm, spring and piston, double-acting piston, hydraulic, electrohydraulic, electric or other known actuator types using either a rotary or sliding stem valve. Thus, the field device 16 is merely illustrative of various types of positioners or other devices for controlling an actuator and valve to modulate power. Moreover, the field device in which the diagnostics of the present invention are used or located can be a device other than a valve including, for example, a pump controller, a variable speed drive, etc. Still further, the field device 16 is not limited to operation in compliance with the Fieldbus standard but is further applicable to other digital communication standards including HART, WORLDFIP, LONWORKS, Profibus and the like.

Of course, device and process diagnostic tests may be stored in the controller 102 in the form of function blocks or other software and may be made so that these diagnostic tests are accessible by the public using any host device, such as a personal computer, so that these tests may implemented without requiring much knowledge on the part of the user. In one embodiment, one or more easily accessible diagnostic routines are stored in the device (e.g., the device 16) and may be run by issuing a single command from a host specifying which test is to be run. All of the data necessary for the test is stored in the device and all output data collected for the test is sent to the host after the test is complete.

Generally speaking, such "public" device and process diagnostics can be commanded to write to transducer blocks to effect movement of, for example, valve components, and to read and store data produced by the sensors using a trending block in the Fieldbus protocol. Because all of information required by the host is located in the device description of the field device, no proprietary knowledge is required to implement any of these public diagnostics. With the use of such public diagnostics, the operation of a field device may be compared with the operation of any other field device made by other manufacturers having the same diagnostics therein.

Figure 10A:
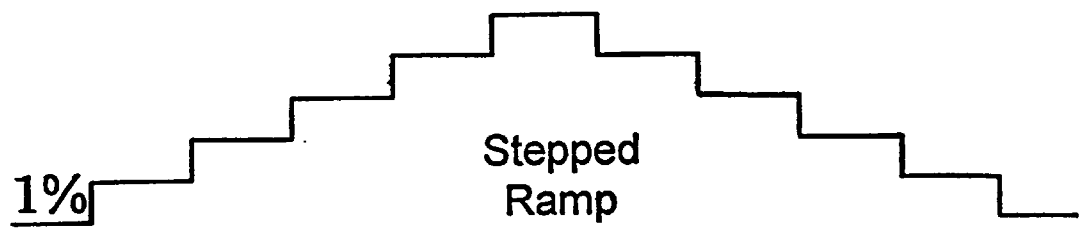
FIGS. 10A, 10B, and 10C are graphs depicting different diagnostic test signals used to perform device diagnostics according to the present invention.
Figure 10B:
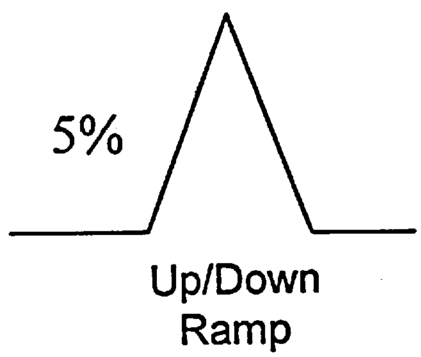
Figure 10C:
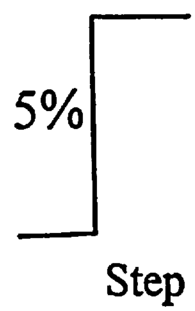

Example waveforms used in such public diagnostics are illustrated in FIGS. 10A–10C. As indicated by FIG. 10A, a public diagnostic may cause the valve 109 to move in a step-wise ramping manner in the opening direction at individual steps of, for example, one percent for a particular number of steps (e.g., five steps) and is then moved in a step-wise ramping manner in the closing direction at individual steps of one percent until the initial value or position of the valve has been reached. Preferably, a step to the new set point is instantaneous, i.e., no rate limits are in effect, and the delay time at each new set point is fixed and is determined by the size and response characteristics of the valve/actuator device. Alternatively, as indicated by FIG. 10B, a public diagnostic may move a valve through a ramp of five percent in the opening direction and then immediately move the valve through a ramp of five percent in the closing direction. The rate of the ramps are preferably fixed and set to a rate determined by the valve/actuator size. Most preferably, the ramp rate is approximately one-half of the maximum rate of the speed for the device. Moreover, as indicated by FIG. 10C, a public diagnostic may move a valve in the opening (or closing) direction in a single, for example, five percent step from the current valve position, with the instantaneous step time set that so that no rate limits are in effect. This test concludes with the valve in a new valve baseline position five percent above (or below) the initial point.

To implement the public diagnostics illustrated in FIGS. 10A–10C using the Fieldbus protocol, the host 12 sends an execution command to the device storing the public diagnostics which sets a trend list in the device (e.g., the device 16) and then sets an appropriate VCR in the device 16 for trending. Next, the link object of the device 16 is set for trending and, thereafter, the diagnostic test proceeds. At this time, the host may display a message to the user indicating that the diagnostics are in process and the host may read the status or progress of the diagnostics to determine if an error condition occurs. After the device 16 has completed the diagnostic, the host reads and stores the trended data and turns the trending off. The host may then perform analysis on the retrieved data. If a status of, for example, 200% or more is received from the device 16, an error in the diagnostics has occurred and the host may indicate such an error to the user. After analyzing the received data, the host may display the diagnostic data developed from the stored trends or any results determined therefrom to the user. For example, the host 12 may graphically depict the actual movement of the valve in response to one or all of the above-described public diagnostic waveforms along with the input waveform to depict the response of the device 16 to the waveform.

When performing a public, or other diagnostic, the device 16 first determines if a diagnostic command signal has been received and, if so, verifies that the transducer block of the device is operating satisfactorily. If so, the device 16 then sets updated pointers for trend data to indicate which data should be stored in the trend block and verifies that a sufficient set point range is available to perform the diagnostic. For example, to run a test that requires five percent movement of the valve in the opening direction, the valve must be at or below 95 percent of its maximum movement. If this range is not available, the device 16 may send back an error message to the host 12.

If no error has occurred, the device 16 runs a selected test using test times and slope rates determined from a lookup table (based on the valve/actuator size) stored in the device

16 and takes the desired measurements such as the position of the valve. During the test, the valve updates the test status with a percent complete from 0–100 percent and, if an error is detected, writes an error code greater than 200 percent to a diagnostic status variable which is read by the host 12. At the end of the test, assuming no errors have been reached, the diagnostic test writes a 100 percent status in the diagnostic test status variable and, thereafter, reports collected trend data to the host using normal stack operations set up to do the trending according to standard Fieldbus protocols. Preferably, the loop speed of the diagnostic test is set to be relatively high as compared to the changes within the input waveform so that enough trend data is collected to adequately model the response of the device 16 to the diagnostic waveform. Thus, in a Fieldbus protocol, where the frequency of data sampling in a trend object is tied to the execution rate of the function blocks, the loop execution rate should be much higher than the rate of changes within the input waveform to enable the trend object to collect enough data to observe the response of the device 16 to the input waveform after each significant change therein.

Of course, the public diagnostics illustrated in, for example, FIG. 10, are best suited to perform device diagnostics, in that they can be advantageously used to cause a particular device to go through one or more diagnostic steps or operations during which time the outputs of transducers within the device are measured to determine characteristics of that device. When used in a Fieldbus protocol for device diagnostics, these tests do not require the use of any additional function blocks but, instead, can be run by an individual device controller (such as the controller 102 of FIG. 6) to control the transducer blocks apart from the normal operation associated with the function blocks operating within the device. Of course, if desired, a function block may be used to analyze the collected data in some manner and to provide the analyzed data to the host.

Figure 11A:
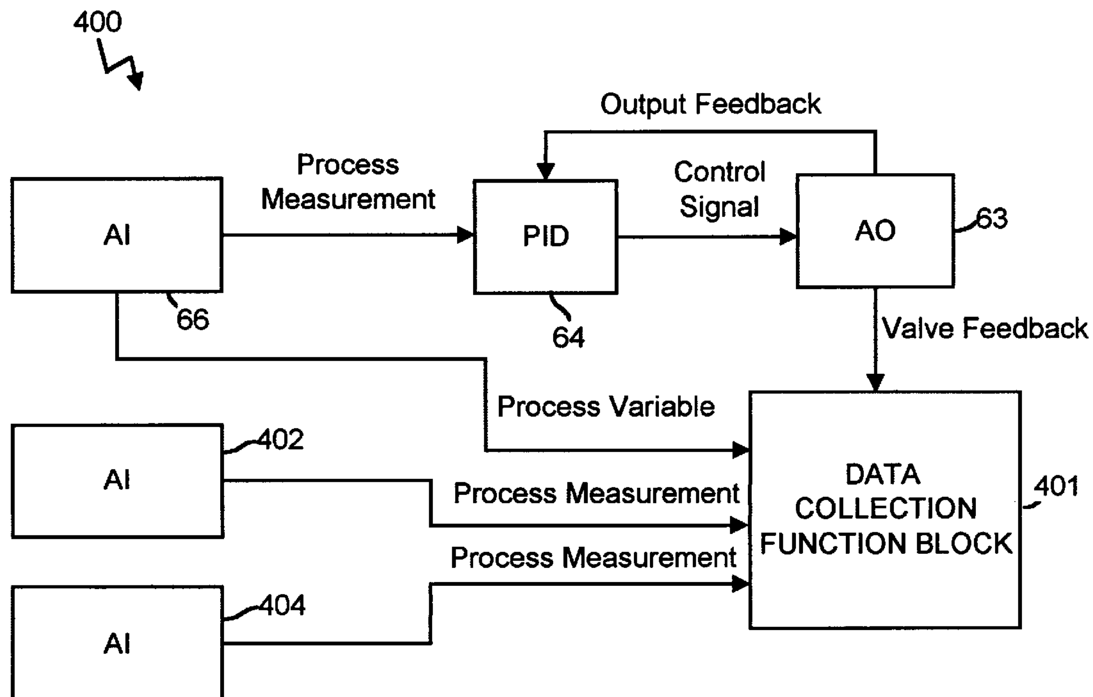
FIGS. 11A and 11B are control loop schematics including a diagnostic data collection function block according to the present invention.

Referring now to FIG. 11A, a process control loop 400 capable of implementing device or process diagnostics locally from a device in a Fieldbus process control network is illustrated in detail. The loop 400 includes the control loop, LOOP1 of FIG. 4, having the AI function block 66 of the device 20 communicatively connected via the bus 34 with the PID function block 64 and the A/O function block 63 both of the device 16. The loop 400 also includes a data collection function block 401 configured to receive data from the AO function block 63, the AI function block 66 and, if desired, other function blocks such as AI function blocks 402 and 404, which may be located in other field devices connected within the process control network 10. Of course, the function blocks 66, 402 and 404 are configured to communicate with the data collection function block 401 using standard synchronous communications, such as publisher/subscriber communications defined within the Fieldbus protocol.

During operation, the controller 102 within the field device 16 interrupts the normal operation of the loop formed by the function blocks 66, 64 and 63 and delivers a diagnostic waveform to the input of the AO function block 63. At that time, the AO function block 63 has its status mode changed to, for example, a local control mode, which cascades back to the PID function block 64 causing the PID function block 64 to shed its mode status to, for example, manual, which in turn prevents the PID function block 64 from producing an output signal based on the inputs received thereby. As noted above, the diagnostic waveform may be stored in the controller 102 of the device 16 or may be provided by the host 12 prior to implementation of the diagnostic test. Of course, the waveform or other instructions cause the valve associated with the device 16 to go through a series of movements associated with a device or a process diagnostic test.

During a device diagnostic, the data collection function block 401 receives data from the AO function block 63 as well as data from other transducers within the device 16, such as transducers associated with position sensors and/or any of the pressure sensors like those illustrated in FIG. 6. During a process diagnostic, the data collection function block 401 also or alternatively receives data related to process variables as developed by the AI function blocks 66, 402, 404, as well as any other function blocks within the process control network 10. The data collection function block 401 may collect this data along with data pertaining to the timing and the magnitude of the diagnostic waveform delivered to the AO function block 63 and may store this data for future delivery to the host 12, where it may be processed and illustrated to a user.

After the device or process diagnostic test is completed, the data collected by the function block 401 is delivered to the host 12 and the controller 102 releases control of the AO function block 63 back to the PID function block 64 to return the loop comprising the blocks 66, 64 and 63 to normal operation. Of course, at this time, the status mode of the blocks 64 and 63 are returned to normal operation.

It should be noted that, while the data collection function block 401 does not necessarily require any scheduled synchronous execution time, the communication interconnections of the function block 401 must be established when configuring the process control loop 400 and, therefore, these communication interconnections exist even when no diagnostic is running. In other words, when the data collection function block 401 needs to have data published to it over the bus 34, it must be configured to receive that data (i.e., the data published by other devices) at the initialization of the process control network 10 to avoid requiring a user to reconfigure the network 10 simply to perform diagnostics. However, as noted above, because the data collection function block 401 will generally collect only process variable data that is already published on the bus 34 or will collect data generated internally within the device in which the data collection function block 401 is present, the operation of the data collection function block 401 will not generally add to the amount of synchronous communications on the bus 34 or require additional scheduled execution times for the process control network 10. If desired, however, the data collection function block 401 may be configured to receive data not usually published on the bus, which requires that the publishing block be configured to publish that data at the start-up of the process control network 10.

Figure 11B:
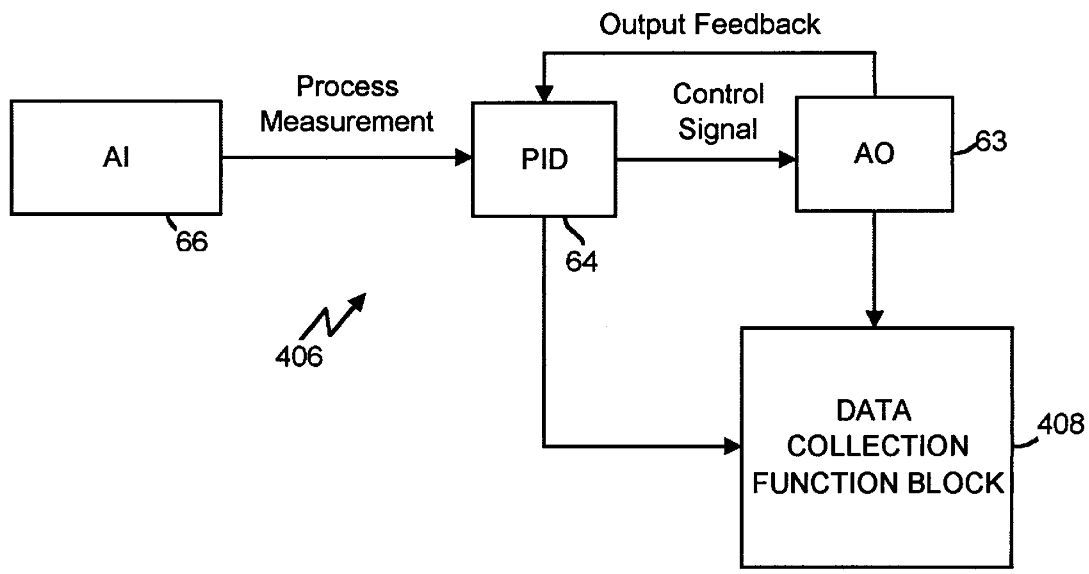

Referring now to FIG. 11B, a process control loop 406 capable of implementing local diagnostics within a device in a Fieldbus process control network is illustrated in detail. Similar to the loop 400 of FIG. 11A, the loop 406 includes the control loop, LOOP1 of FIG. 4, having the AI function block 66 of the device 20 communicatively connected via the bus 34 with the PID function block 64 and the A/O function block 63 both of the device 16. The loop 406 also includes a data collection function block 408 (located in the device 16) which operates essentially the same as the data collection function block 401 except that it is configured only to receive data locally from, for example, the AO function block 63, the PID function block 64 or any other transducers or sensors within the device, such as pressor sensors, position sensors, etc. The data collection function block 408 is especially useful in performing device diagnostics where the required data is generated locally within a device. Because, the block 408 does not need to receive data from the bus 34, it does not have to be configured initially at the start-up of the process control network.

Of course, the data collection function blocks 401 and 408 are only two ways of collecting diagnostic data within a process control device, there being many other methods of collecting such data in different types of process control networks and devices. For example, the data for a device or a process may be collected by other parasitic software located in a device that does not conform to the definition of a fieldbus function block.

Figure 12:
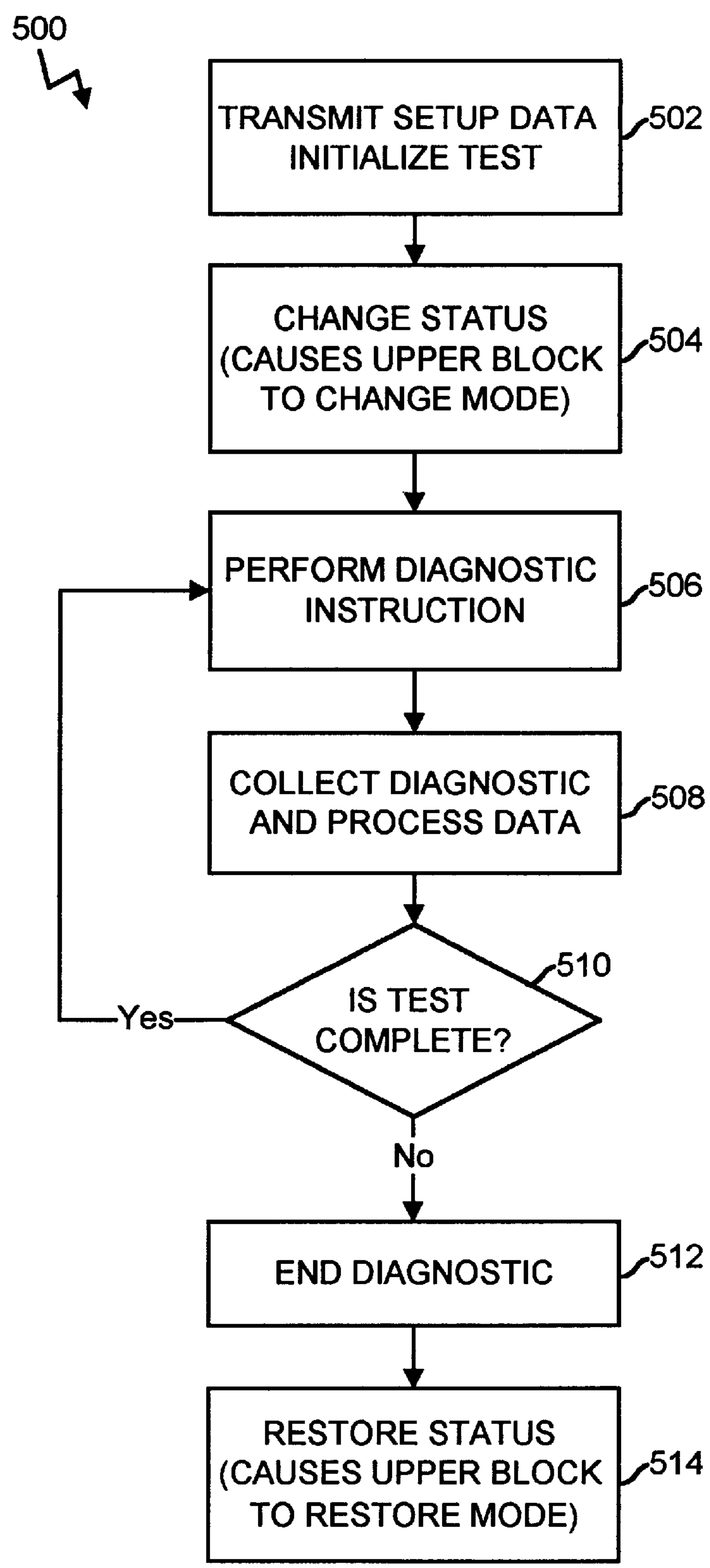
FIG. 12 is a flow chart illustrating a diagnostic test protocol for performing a process diagnostic test using the diagnostic data collection function block of FIG. 11.

Referring now to FIG. 12, a flowchart 500 illustrates steps performed by a typical process diagnostic using, for example, the loop 401) of FIG. 11. At a step 502, a data collection setup is provided to the data collection function block 401 and other data necessary for a diagnostic test is delivered from a host (e.g., host 12) to the device 16 in which the diagnostic is to be executed. Thereafter, the diagnostic is initialized by a user to cause the loop being tested to be isolated from the rest of the process control network. Upon initialization, the device 16 changes the status of the AO function block 63 to, for example, a local control mode, which causes the PID function block 64 (or other upstream function blocks) to change mode automatically according to Fieldbus control standards. Thereafter, a block 506 performs a diagnostic instruction stored within the memory of the device 16 and the data collection function block 401 collects diagnostic and process data at the block 508. A block 510 determines if the test is complete and, if not, returns control to the block 506 which performs the next diagnostic instruction. Of course, the next instruction may be a repeat of the previous one causing, for example, a device to move in single direction until a limit has been reached.

The loop performed by the blocks 506, 508 and 510 repeats until the test is complete or until some error has occurred or is detected at the block 510, at which time a block 512 ends the diagnostic test and a block 514 restores normal operating status to, for example, the AO function block 63 which causes the PID function block 64 to again change its status and control the AO function block 63 according to normal control operation.

The data collected by the data collection function block 401 is provided to the host 12 which analyses and/or displays the data. If desired, analysis can be performed in the device 16 and the results of the analysis may be provided by the host 12 to a display unit for display.

Using the device diagnostic method according to the present invention, the device 16 collects both device and process data without requiring separate control by a host to implement or receive the data. Because the diagnostic is performed within a device and is controlled by the controller of that device instead of a separate host device, the timing of the test can be controlled precisely and data collected during a diagnostic test can be easily time aligned with the operation performed by the device to provide accurate correspondence between the test waveform and the results of the test. When implemented to perform a process diagnostic, the data collection function block 401 of the loop 400 (or any similar loop having a data collection function block configured to collect data from one or more process control loops) can be used to target loop performance rather than just device performance and can be used to indicate whether or not a valve is appropriate for a loop or if there are other issues with the loop that would limit its overall performance. Process and/or device testing may be implemented periodically without requiring a process to be shutdown or placed in a non-operating state. Of course, when the data collection function block 401 is configured to collect only data already published on the loop, it is limited by the control schedule as to the data that can be collected and used for diagnostics.

Although the diagnostic functions have been described herein as performing diagnostics on or using a downstream AO function block 63 (which is an output function block), and as receiving inputs from and delivering feedback to an upstream PID function block 64 (which is a control function block) connected in a simple control loop configuration, the data collection function block 401 or other diagnostic function routine of the present invention can be used in conjunction with other output functions or function blocks and other control functions or function blocks as desired and can be implemented in control loops; having configurations other than that illustrated in FIG. 11.

Moreover, while some of the diagnostics described herein have been implemented in the form of a Fieldbus "function block," it is noted that the diagnostics of the present invention can be implemented using other types of blocks, programs, hardware, firmware, etc., associated with other types of control systems and/or communication protocols. In fact, while the Fieldbus protocol uses the term "function block" to describe a particular type of entity capable of performing a process control function, it is noted that the term function block as used herein is not so limited and includes any sort of device, program, routine, or other entity capable of performing a process control function in any manner at distributed locations within a process control network. Thus, the diagnostic function blocks described and claimed herein can be implemented in other process control networks or using other process control communication protocols or schemes (that may now exist or that may be developed in the future) which do not use what the Fieldbus protocol strictly identifies as a "function block."

Still further, while process and device diagnostics have been described herein as being used in performing diagnostics on (or using) positioner/valve devices, it is noted that these diagnostics can be performed on (or using) other types of devices, such as those having moveable elements like dampers, fans, etc. Likewise, although the diagnostics described herein are preferably implemented in software stored in a process control device, they may alternatively or additionally be implemented in hardware, firmware, etc., as desired. If implemented in software, the diagnostics of the present invention may be stored in any computer readable memory such as on a magnetic disk, a laser disk, or other storage medium, in a RAM, ROM, EPROM, etc. of a computer, and the like. Likewise, this software may be delivered to a user or a device via any known or desired delivery method including, for example, over a communication channel such as a telephone line, the internet, etc.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A field device for use in a process control network having a plurality of devices communicatively coupled by an all-digital communication bus, the field device comprising:

a connector that connects to the all-digital bus to enable all-digital communication over the bus;

a memory that stores a diagnostic test routine having a series of diagnostic test instructions;

a controller that performs the diagnostic test instructions stored in the memory to implement a diagnostic test using an operational capability of the field device;

a data collection unit that collects diagnostic data generated during the diagnostic test; and a communication unit that communicates the collected diagnostic data over the bus in an all-digital format.

2. The field device of claim 1, further comprising a positioner coupled to a valve having a moveable valve member and wherein the diagnostic test instructions specify movement of the valve member.

3. The field device of claim 2, further including a position sensor that senses the position of the moveable valve member during the diagnostic test and that delivers a position signal indicative of the valve member position to the data collection unit.

4. The field device of claim 3, wherein the positioner includes a pneumatic pressure line coupled to a current-to-pressure transducer and further including a pressure sensor coupled to the pneumatic pressure line that senses the pressure in the pneumatic pressure line and that delivers a pressure signal indicative of the pressure in the pneumatic pressure line to the data collection unit.

5. The field device of claim 4, further including a pneumatic relay coupled on the pneumatic pressure line between the electrical to pneumatic transducer and a valve and the pressure sensor is coupled to the pneumatic pressure line between the electrical to pneumatic transducer and the pneumatic relay.

6. The field device of claim 4, further including a pneumatic relay coupled on the pneumatic pressure line between the electrical to pneumatic transducer and a valve and the pressure sensor is coupled to the pneumatic pressure line between the pneumatic relay and the valve.

7. The field device of claim 4, wherein the pneumatic pressure line includes a pressure supply line that is coupled to an input of the electrical to pneumatic transducer and the pressure sensor is coupled to the pneumatic pressure supply line to measure the pressure supplied to the input of the electrical to pneumatic transducer.

8. The field device of claim 1, wherein the controller includes a program language interpreter adapted to interpret a program language and wherein the diagnostic test instructions are stored in the program language.

9. The field device of claim 8, wherein the communication unit is adapted to receive the diagnostic test instructions in the program language from a second one of the plurality of devices via the bus and to store the received diagnostic test instructions in the memory.

10. The field device of claim 1, wherein the field device includes a member that is moveable in an opening and a closing direction and wherein the diagnostic test instructions cause the member to move through a stepwise ramp in the opening and in the closing directions.

11. The field device of claim 10, wherein the step-wise ramp includes steps equal to approximately one percent of a range of movement of the member.

12. The field device of claim 1, wherein the field device includes a member that is moveable in an opening and a closing direction and wherein the diagnostic test instructions cause the member to move through a linear ramp in the opening and the closing directions.

13. The field device of claim 12, wherein the diagnostic test instructions cause the member to move at a ramp rate equal to approximately one-half of the maximum rate of movement of the member.

14. The field device of claim 1, wherein the field device includes a member that is moveable and wherein the diagnostic test instructions cause the member to move in a step.

15. The field device of claim 14, wherein the step has an amplitude of approximately five percent of a movement range of the member.

16. A field device for use in a process control network having a plurality of devices communicatively coupled by a bus, the field device comprising:

a memory that stores a diagnostic test routine having a series of diagnostic test instructions;

a device controller that performs the diagnostic test instructions stored in the memory to implement a diagnostic test using an operational capability of the field device;

a data collection unit that collects diagnostic data generated during the diagnostic test; and a communication unit that receives the diagnostic test instructions from a second one of the plurality of devices via the bus, that stores the received diagnostic test instructions in the memory and that communicates the collected diagnostic data over the bus.

17. The field device of claim 16, wherein the diagnostic test instructions are written in a program language and the device controller includes a program language interpreter that interprets the diagnostic test instructions to perform the diagnostic test.

18. The field device of claim 17, further comprising a positioner coupled to a valve having a moveable valve member and wherein the diagnostic test instructions specify movements of the valve member.

19. The field device of claim 18, further including a position sensor that senses the position of the valve member during the diagnostic test and that delivers a position signal indicative of the valve member position to the data collection unit.

20. The field device of claim 19, wherein the positioner includes a pneumatic pressure line coupled to a current-to-pressure transducer and further including a pressure sensor coupled to the pneumatic pressure line that senses the pressure in the pneumatic pressure line and that delivers a pressure signal indicative of the pressure in the pneumatic pressure line to the data collection unit.

21. The field device of claim 16, wherein the communication unit is configured to communicate over the bus using a Fieldbus protocol.

22. The field device of claim 16, wherein the diagnostic test instructions implement a process diagnostic and the communication unit is adapted to receive data via the bus pertaining to process variables measured by other ones of the plurality of devices.

23. A field device for use in performing a process diagnostic test in a process control network having a plurality of devices communicatively coupled by a bus, the field device comprising:

a memory that stores a process diagnostic test routine having a series of diagnostic test instructions to be implemented by the field device;

a device controller that performs the process diagnostic test instructions stored in the memory to implement a process diagnostic test using an operational capability of the field device;

a data collection unit that collects diagnostic data generated by the field device during the process diagnostic test and that receives further process diagnostic data from a second one of the plurality of devices via the bus; and a communication unit that communicates the collected diagnostic data and the further process diagnostic data over the bus after the process diagnostic test is completed.

24. The field device of claim 23, wherein the communication unit is configured to communicate over the bus using a Fieldbus communication protocol and wherein the data collection unit is a function block configured to receive the further process diagnostic data from the second one of the plurality of devices over the bus.

25. The field device of claim 24, wherein the function block is configured to receive the further process diagnostic data over the bus using synchronous communications.

26. The field device of claim 23, wherein the device controller includes a mode handling unit that controls the mode of components within a process control loop performing the process diagnostic test.

27. A process control network comprising:

a host device that generates commands and receives data;

a plurality of field devices; and a bus communicatively interconnecting the host device and the plurality of field devices;

wherein one of the plurality of field devices includes a memory that stores a diagnostic test routine having a series of diagnostic test instructions to be implemented by the one device, a device controller that performs the diagnostic test instructions stored in the memory to implement a diagnostic test using an operational capability of the field device, a data collection unit that collects diagnostic data generated by the one device during the diagnostic test, and a communication unit that communicates the collected diagnostic data over the bus to the host device after the diagnostic test is completed.

28. The process control network of claim 27, wherein the diagnostic test routine is a process diagnostic test routine and the data collection unit receives process diagnostic data from a second one of the plurality of field devices via the bus.

29. The process control network of claim 27, wherein the controller includes a program language interpreter adapted to interpret a program language and wherein the diagnostic test instructions are stored in the program language.

30. The process control network of claim 29, wherein the communication unit is adapted to receive the diagnostic test instructions in the program language from the host device via the bus and to store the received diagnostic test instructions in the memory prior to implementation of the diagnostic test.

31. The process control network of claim 27, wherein each of the plurality of field devices is capable of performing a process control function and of communicating on the bus using scheduled periodic communications and non-periodic communications.

32. The process control network of claim 27, wherein the one of the plurality of field devices includes a member that is moveable in an opening and a closing direction and wherein the diagnostic test instructions cause the member to move through a stepwise ramp in the opening and in the closing directions.

33. The process control network of claim 32, wherein the step-wise ramp includes steps equal to approximately one percent of a range of movement of the member.

34. The process control network of claim 22, wherein the one of the plurality of field devices includes a member that is moveable in an opening and a closing direction and wherein the diagnostic test instructions cause the member to move through a linear ramp in the opening and the closing directions.

35. The process control network of claim 34, wherein the diagnostic test instructions cause the member to move at a ramp rate equal to approximately one-half of the maximum rate of movement of the member.

36. The process control network of claim 27, wherein the one of the plurality of field devices includes a member that is moveable and wherein the diagnostic test instructions cause the member to move in a step.

37. The process control network of claim 36, wherein the step has an amplitude of approximately five percent of a movement range of the member.

38. A field device for use in performing a diagnostic test in a process control network having a plurality of devices communicatively coupled by a bus and using the Fieldbus communication protocol, the field device comprising:

a memory that stores the diagnostic test routine having a series of diagnostic test instructions to be implemented by the field device;

a device controller that performs the diagnostic test instructions stored in the memory to implement a diagnostic test using an operational capability of the field device;

a data collection function block that collects diagnostic data generated during the diagnostic test; and a communication unit that communicates the collected diagnostic data over the bus after the diagnostic test is completed.

39. The field device of claim 38, wherein the diagnostic test is a device diagnostic test and wherein the data collection function block collects data from the field device.

40. The field device of claim 38, wherein the diagnostic test is a process diagnostic test and wherein the data collection function block collects at least part of the diagnostic data from a further field device via communications over the bus.

* * * * *

UNITED STATES PATENT AND TRADEMARK OFFICE

CERTIFICATE OF CORRECTION

PATENT NO. : 5,970,430

DATED : October 19, 1999

INVENTOR(S) : Burns et al.

It is certified that error appears in the above-identified patent and that said Letters Patent is hereby corrected as shown below:

In Claim 34, at Column 38, Line 10, "claim 22" should be "claim 27";

Signed and Sealed this

Nineteenth Day of September, 2000

Attest:

Q. TODD DICKINSON

*Attesting Officer*

*Director of Patents and Trademarks*